United States Patent
Barber et al.

(10) Patent No.: US 9,462,818 B2
(45) Date of Patent: Oct. 11, 2016

(54) HIGH AMPLITUDE CORRUGATED FOOD PRODUCT

(71) Applicants: Keith Alan Barber, Frisco, TX (US); Deborah Fischer, McKinney, TX (US); John Hildebrand, Flower Mound, TX (US); Enrique Michel, Dallas, TX (US)

(72) Inventors: Keith Alan Barber, Frisco, TX (US); Deborah Fischer, McKinney, TX (US); John Hildebrand, Flower Mound, TX (US); Enrique Michel, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 13/743,915

(22) Filed: Jan. 17, 2013

(65) Prior Publication Data

US 2013/0183415 A1 Jul. 18, 2013

Related U.S. Application Data

(60) Provisional application No. 61/587,943, filed on Jan. 18, 2012.

(51) Int. Cl.
*A23L 1/00* (2006.01)

(52) U.S. Cl.
CPC .............. *A23L 1/0073* (2013.01); *A23L 7/117* (2016.08); *A23L 19/09* (2016.08); *A23L 19/12* (2016.08); *A23L 19/18* (2016.08); *A23P 30/10* (2016.08)

(58) Field of Classification Search
CPC ..... A23L 1/01; A23L 1/0107; A23L 1/0014; A23L 1/0073; A23L 1/164; A23L 1/1645; A23L 1/1646; A23L 1/1648; A23L 1/216; A23L 1/2163; A23L 1/217; A23L 1/2175; A23L 1/1643; A23L 1/00; A23J 3/26; A47J 37/1204; A23G 3/50; A23P 1/00; A23P 1/10; A23P 1/105; A21D 2/186; A21D 2/36; A21D 2/362
USPC ....... 426/144, 104, 512, 390, 391, 439, 549, 426/138, 615, 637, 44
See application file for complete search history.

(56) References Cited

U.S. PATENT DOCUMENTS

| 95,990 A | 10/1869 | Crowley |
|---|---|---|
| 2,627,644 A | 2/1953 | Boutwell |

(Continued)

FOREIGN PATENT DOCUMENTS

| EP | 0387606 A2 | 9/1990 |
|---|---|---|
| GB | 2172185 A | 9/1986 |

(Continued)

OTHER PUBLICATIONS

Lay's Wavy Original, photograph of bag and close-up of individual chips.

(Continued)

*Primary Examiner* — Erik Kashnikow
*Assistant Examiner* — Lela S Williams
(74) *Attorney, Agent, or Firm* — Colin P. Cahoon; Celina M. Orr; Carstens & Cahoon, LLP

(57) ABSTRACT

A high-amplitude corrugated food product and method of making same. The corrugated food product comprises a corrugated surface on opposing surfaces, each surface having a plurality of peaks with substantially equal amplitude values of at least about 2.54 mm. The corrugated food product further comprises a high area moment of inertia of between about $20 \times 10^{-8}$ $m^3$ to about $160 \times 10^{-8}$ $m^3$ with a dehydration factor of less than about 1.7, which provides for less breakage and more texture. The corrugated food product has a 90°-to-0° hardness ratio of at least about 2.78 and a 90°-to-0° and a crispiness ratio of at least about 3.14.

26 Claims, 13 Drawing Sheets

(56) References Cited

U.S. PATENT DOCUMENTS

| | | |
|---|---|---|
| 2,769,714 A | 11/1956 | Stahmer |
| 2,769,715 A | 11/1956 | Stahmer |
| 3,139,127 A | 6/1964 | Urschel et al. |
| 3,139,130 A | 6/1964 | Urschel et al. |
| 3,498,798 A | 3/1970 | Baur et al. |
| D219,637 S | 1/1971 | Holtz et al. |
| D228,827 S | 10/1973 | Cammelot et al. |
| 3,956,517 A | 5/1976 | Curry et al. |
| 4,320,648 A | 3/1982 | Ekmark |
| 4,508,739 A * | 4/1985 | Ryan .................. 426/144 |
| 4,511,586 A | 4/1985 | Fitzwater et al. |
| 4,515,817 A | 5/1985 | Pavan |
| 4,601,227 A * | 7/1986 | Fitzwater et al. ........... 83/403 |
| 4,650,684 A | 3/1987 | Penrose |
| 4,680,191 A | 7/1987 | Budd et al. |
| 4,852,441 A | 8/1989 | Anders et al. |
| 4,855,151 A | 8/1989 | Fielding |
| 4,889,737 A | 12/1989 | Willard et al. |
| 4,933,194 A * | 6/1990 | Barry et al. ............... 426/144 |
| 4,933,199 A * | 6/1990 | Neel et al. ................. 426/438 |
| 4,973,481 A | 11/1990 | Hunt et al. |
| 5,128,157 A | 7/1992 | Ruiz |
| 5,419,903 A | 5/1995 | Evans et al. |
| D380,885 S | 7/1997 | Goll |
| D389,373 S | 1/1998 | Belue |
| 6,117,466 A | 9/2000 | Moriki et al. |
| D453,977 S | 2/2002 | Park et al. |
| 6,403,135 B1 | 6/2002 | Graham et al. |
| D495,852 S | 9/2004 | Barber |
| D540,507 S | 4/2007 | Aleman et al. |
| D541,006 S | 4/2007 | Baumgartner |
| 7,331,087 B2 | 2/2008 | Lindsay et al. |
| D577,176 S | 9/2008 | Young et al. |
| D625,486 S | 10/2010 | Bhaskar et al. |
| D632,246 S | 2/2011 | Park |
| D640,036 S | 6/2011 | Walker et al. |
| D643,178 S | 8/2011 | Howe et al. |
| D670,560 S | 11/2012 | Amend |
| D670,561 S | 11/2012 | Amend |
| 2002/0160092 A1 | 10/2002 | Villagran et al. |
| 2004/0197530 A1 | 10/2004 | Gritti et al. |
| 2012/0101174 A1 | 4/2012 | Mittag et al. |
| 2014/0007751 A1 | 1/2014 | Michel et al. |

FOREIGN PATENT DOCUMENTS

| | | |
|---|---|---|
| GB | 3023357 | 10/2005 |
| WO | 9601572 A1 | 1/1996 |

OTHER PUBLICATIONS

Ruffles Brand, Ruffles Have Ridges, Original Potato Chips, photograph of bag and close-up of individual chips.

UK Search Report dated Jul. 7, 2014 for Application No. GB1401452.6 filed Jan. 28, 2014 (3 pages).

* cited by examiner

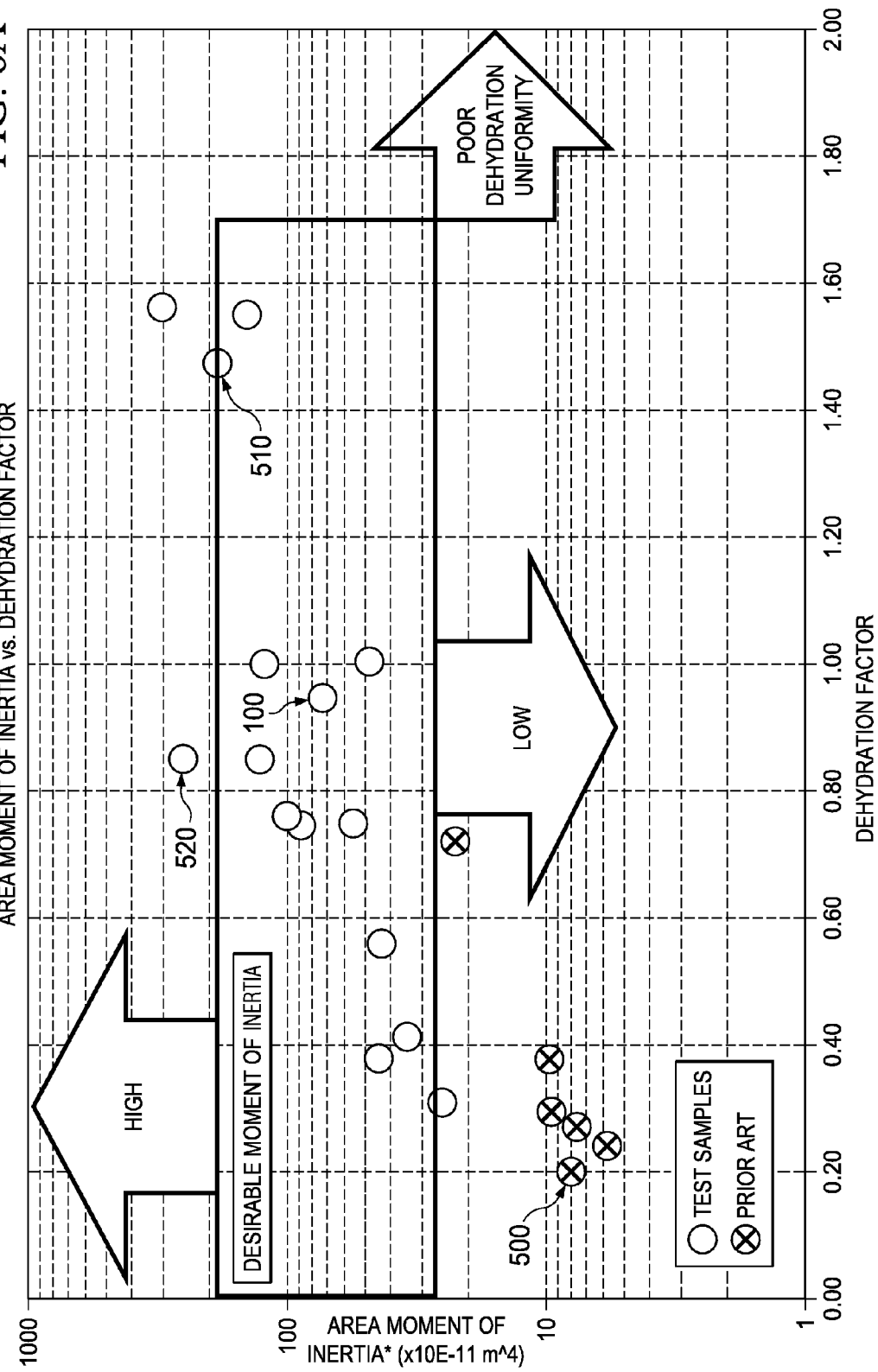

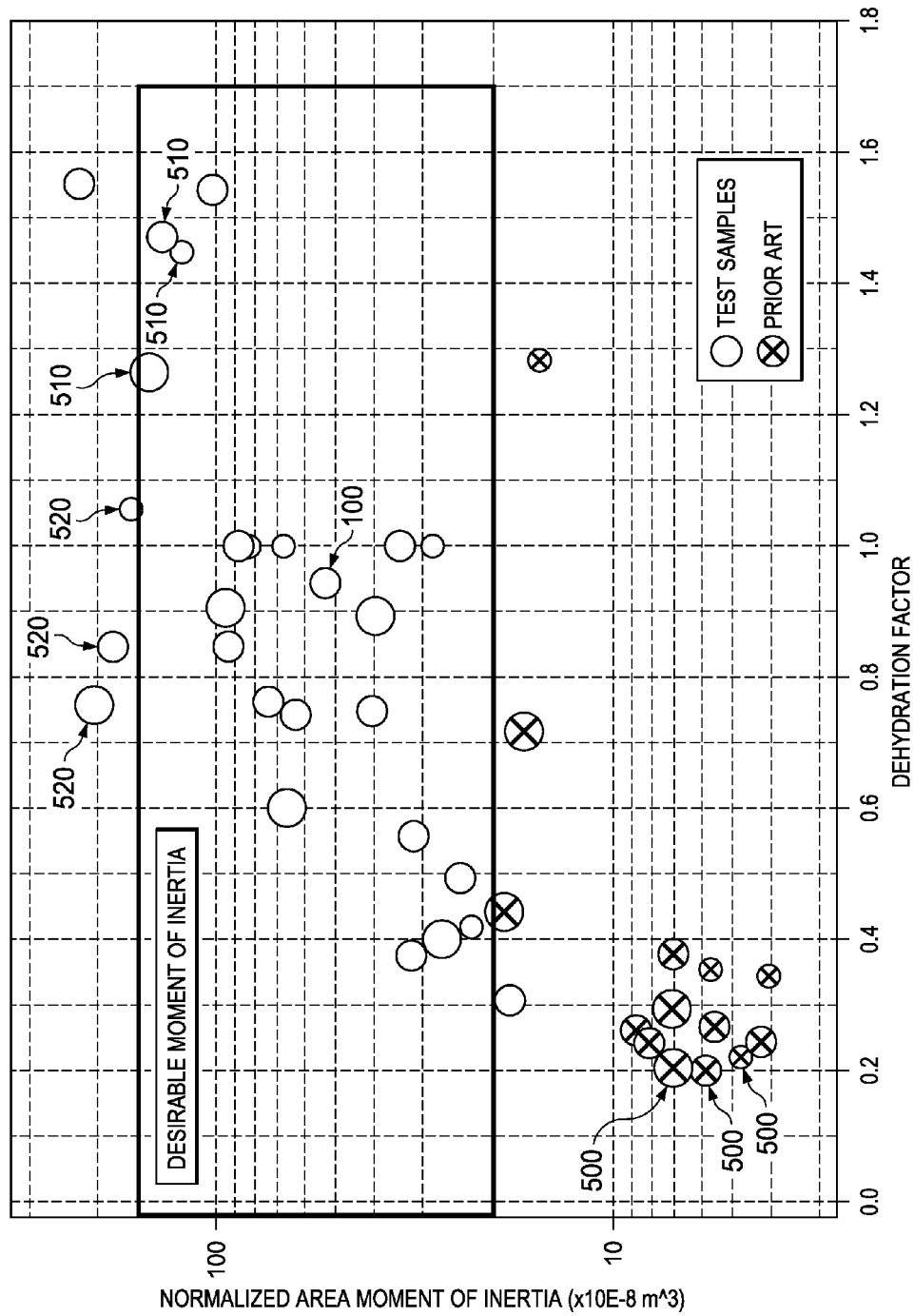

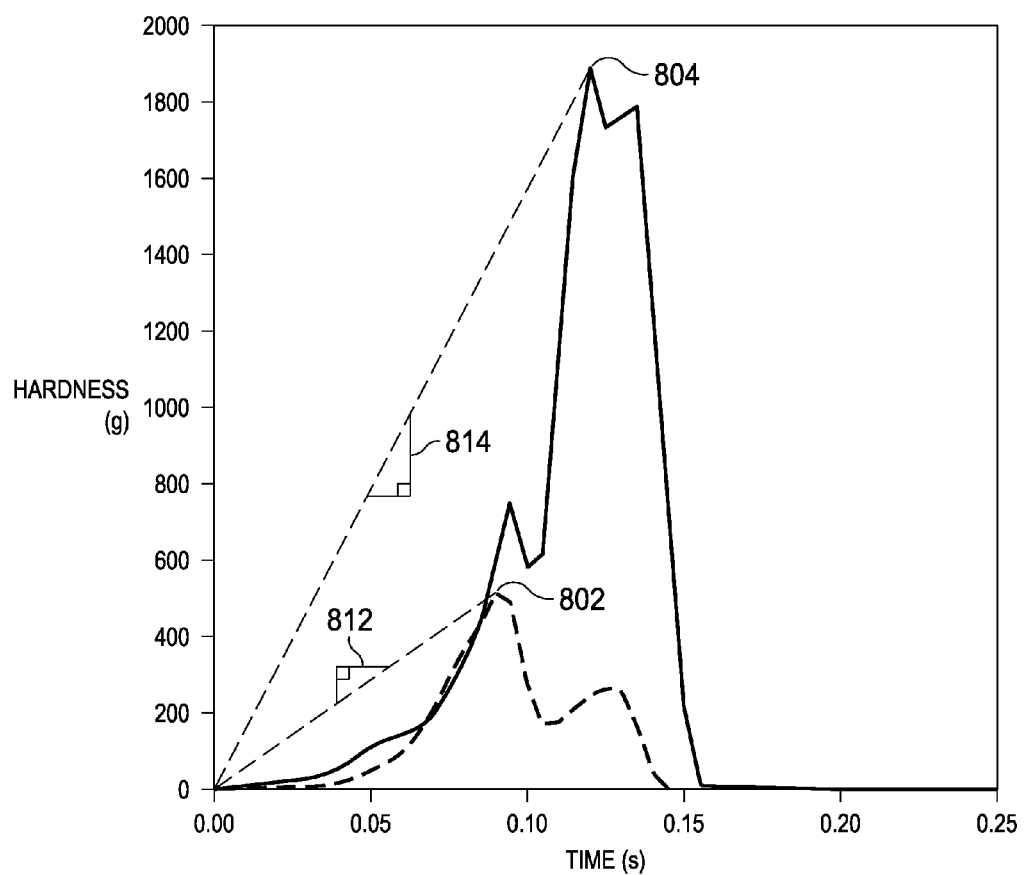

HIGH AMPLITUDE CORRUGATED FOOD PRODUCT

CROSS-REFERENCE TO RELATED APPLICATIONS

This application claims the benefit and the right of priority of the U.S. Provisional Application No. 61/587,943 filed on Jan. 18, 2012, the entire disclosure of which is incorporated by reference.

TECHNICAL FIELD

The present invention relates generally to food products, and more particularly to high-amplitude corrugated food product and method of making the same having unique textural characteristics.

BACKGROUND OF THE INVENTION

Food products having corrugated configurations such as potato chips under the trademark Ruffles® have enjoyed much commercial success. FIG. 1 depicts an enlarged cross-sectional side view of a prior art corrugated snack food product 10 having parallel ridges formed by peaks 12 and grooves 14 forming corrugations on one side and peaks 16 and grooves 18 forming corrugations on the other side. These corrugations on the opposing surfaces of the product 10 are "in-phase" such that the peaks 12 on one side of the product directly overlie the grooves 18 of the other side so that the thickness 20 of the product is substantially uniform along the cross section depicted in FIG. 1.

Examples of corrugated food products having out-of-phase surfaces or different frequencies along opposing sides are also known. Such products have periodically varying thicknesses throughout that, when subjected to dehydration processes, such as frying, cook at different rates. U.S. Pat. Nos. 2,769,714 and 2,769,715 describe several examples of corrugated food products, both in-phase and out-of-phase. However, these require a number of perforations that extend from the first face of the product to the second face in order to properly cook the product. Perforations produce significant amount of waste and require additional processing, time, and equipment. There remains a need in the art for additional corrugated food products with a texture that consumers find appealing while also enabling uniform finished moisture after dehydration steps to produce shelf stable snack food products. The corrugated snack food products should also be strong enough to be used as carriers for dip and resist breakage.

SUMMARY OF THE INVENTION

In accordance with one aspect of the present invention, a high-amplitude corrugated food product having amplitude and texture heretofore unseen is provided which substantially eliminates or reduces disadvantages associated with previous corrugated food products. In one embodiment, a corrugated food product having a first side and a second side is disclosed, wherein the first side comprises a first corrugated pattern and the second side comprises a second corrugated pattern, wherein the first and the second corrugated patterns comprise a plurality of peaks, wherein the food product comprises a moment of inertia of between about $20 \times 10^{-8}$ m$^3$ and about $160 \times 10^{-8}$ m$^3$, a dehydration factor of less than about 1.7. In some embodiments, the peaks of the corrugated food product have an amplitude ranging from about 2.54 mm to about 8.64 mm. The corrugated food products have a 90°-to-0° hardness ratio of at least about 2.6 and a 90°-to-0° crispiness ratio of at least about 2.75 in at least some embodiments.

Another aspect of the present invention discloses a corrugated food product having: a first side and a second side, wherein the first side comprises a first corrugated pattern and the second side comprises a second corrugated pattern, wherein the first and the second corrugated patterns comprise a plurality of peaks, wherein the food product comprises a 90°-to-0° hardness ratio of at least about 2.6.

Another aspect of the present invention discloses a corrugated food product having: a first side and a second side, wherein the first side comprises a first corrugated pattern and the second side comprises a second corrugated pattern, wherein the first and the second corrugated patterns comprise a plurality of peaks, wherein the food product comprises a 90°-to-0° crispiness ratio of at least about 2.75.

Corrugated snack food products comprising a high-amplitude are produced, which can be cooked without negatively impacting shelf life and without significantly increased cooking times. The high-amplitude corrugated food product comprises corrugations with substantially the same amplitude, pitch, and tip radius on opposing sides while providing for a high area moment of inertia and a low dehydration factor. Dehydrated high-amplitude corrugated food products can be safely stored in a sealed package at room temperatures for a long shelf life.

An object of the invention is to economically produce a corrugated food product having large corrugations producing a unique textural experience upon cooking.

Another object of the invention is to produce an overall thicker corrugated food product that delivers a heartier texture and more filling sensation.

Another object of the invention is to produce an appealing corrugated food product while also enabling consistent or uniform finished moisture throughout the product at the conclusion of a dehydration step.

Another object of the invention is to produce a corrugated food product having a uniform low moisture without significantly increasing the time required to dehydrate the chip and without having to perforate the chip prior to cooking into a shelf-stable snack food product.

Another object of the invention is to produce a corrugated food product that provides for a different textural experience while remaining crunchy, strong, satisfying and flavorful.

Another object of the invention is to economically produce a corrugated food product with the above advantages using existing equipment and hardware with minimal or no modifications.

Certain embodiments of the present invention may enjoy some, all, or none of these advantages. Other objects, technical advantages, and features may be apparent from the following description in conjunction with the accompanying drawings.

BRIEF DESCRIPTION OF THE DRAWINGS

The present invention will become apparent from the detailed description, which follows, when considered together with the accompanying drawings, which are given by way of illustration only and are not intended to be limitative thereof, and in which like reference numerals refer to like elements, and wherein:

FIG. 6A illustrates a graphical representation of the relationship between the area moment of inertia and dehydration factor of corrugated food products illustrated in FIGS. 2, 5A, 5B, and 5C.

FIG. 6B illustrates a graphical representation of the relationship between the normalized area moment of inertia and dehydration factor of corrugated food products illustrated in FIGS. 2, 5A, 5B, and 5C.

FIG. 8 illustrates a graphical representation of the hardness testing results in the 90° orientation and the 0° orientation according to one embodiment.

DETAILED DESCRIPTION

Figure 1:
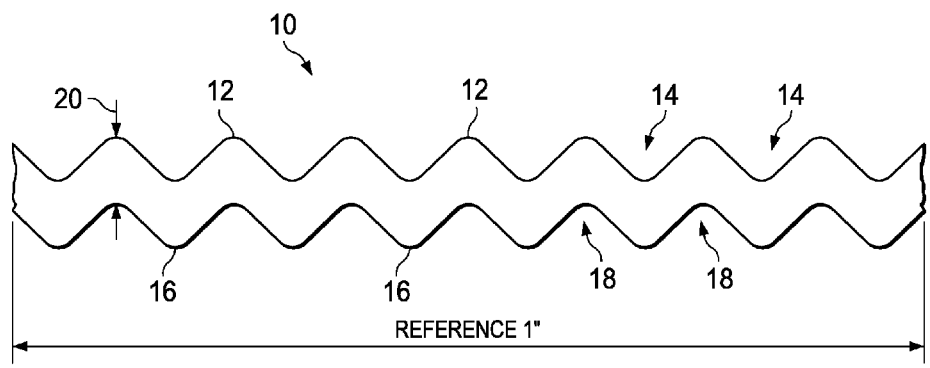
FIG. 1 illustrates an enlarged fragmentary cross-sectional view taken along a plane perpendicular to the corrugations of a prior art corrugated food product.
Figure 2:
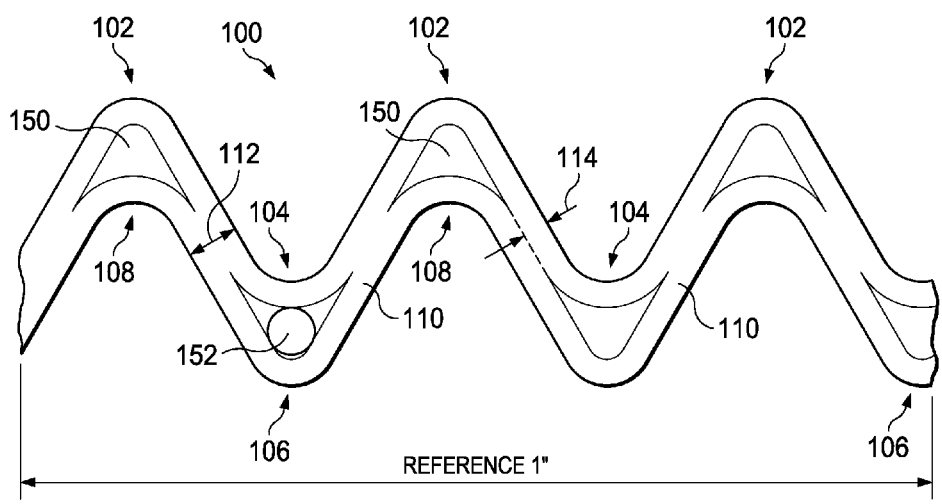
FIG. 2 illustrates a cross-sectional view taken along a plane perpendicular to the corrugations of a corrugated food product according to one embodiment.

An improved, high-amplitude corrugated food product with corrugated surfaces and the method for making it is disclosed. As used herein, corrugated surface refers to an undulating surface having peaks and grooves. FIG. 2 depicts a fragmentary cross-sectional view of one embodiment of a corrugated food product 100 comprising peaks 102 and grooves 104 forming a first corrugated surface along one side, and peaks 106 and grooves 108 forming a second corrugated surface on its opposing side. The first corrugation surface is generally in phase with the second corrugation surface, forming a corrugated product where the peaks 102 on first side directly overlie the grooves 108 on the opposite (second) side when viewed with the naked eye. Some embodiments of the corrugated food products disclosed herein comprise no intentional or significant phase shift. In other embodiments, the first and the second corrugated surfaces are not in phase. A first corrugated surface is substantially similar to and substantially parallel to a second corrugated surface such that every point along a wave of first corrugated surface is substantially parallel to a corresponding point of the opposing wave of the second corrugated surface. As used herein, "substantially" parallel means the patterns are parallel when viewed with the naked eye. In one embodiment, the second corrugation pattern of the present invention is substantially identical to a first corrugated pattern of the snack food product, where both patterns are substantially in phase with each other and have the same amplitude, pitch and tip radius. Those skilled in the art will understand that the products described herein may comprise cell expansion and collapse and/or other variables, which will create variability in the surface smoothness and physical shape. Thus, while the figures presented herein depict the cross-sectional shapes in their simplest form with smooth uniform surfaces, the products may comprise both smooth, uniform surfaces as well as rough, less uniform surfaces. In some embodiments, the peaks 102, 106 are nonsymmetrical when compared between one peak and its adjacent or subsequent peaks. The web 110 region lies between a peak 102 and its adjacent groove 104 (or peak 108 and groove 106 when viewed from the perspective of the second corrugated surface) and is formed by substantially parallel lines of the first corrugated surface and the second corrugated surface. The minimum web thickness 112 refers to the minimum distance between two opposing faces of a corrugated food product or, stated differently, the smallest measurement of the perpendicular distance between two opposing faces (i.e., the first and the second corrugated surfaces).

When a corrugated food product 100 undergoes a dehydrating cooking process (for example, frying or baking), cooking begins on either side of the product 100, and will dehydrate beginning at the outer surface (the first and the second corrugated surfaces) and continue penetrating deeper over time. At the thinnest cross-sections, the dehydrated boundary will reach the center of the piece first. This location is considered the minimum web thickness 112, and the distance to the center of this section is referred to as half web thickness 114, which is the half of the minimum web thickness 112. The thickness of the cooked region is substantially equal to the half web thickness 114 in the web 110 region. But wet zones 150 exist where thickness between the first and the second corrugated surface is generally greater at the peaks 102, 106. Wet zone refers to the area within the corrugated food product 100 where higher moisture still exists upon dehydration of the thinnest cross-section of the corrugation surface. Wet zones 150 generally lie at the peaks 102, 106 between the two layers of cooked zones that are about half web thickness 114 deep. Wet zone concentration 152 refers to the area representing the highest concentration of wet zone 150. This is located at and bound by the largest possible circle that can be inscribed inside the wet zone 150 (see FIGS. 2 and 6A-6C, for example). The wet zone concentration diameter refers to the diameter of the circle defining the wet zone concentration 152.

Figure 3A:
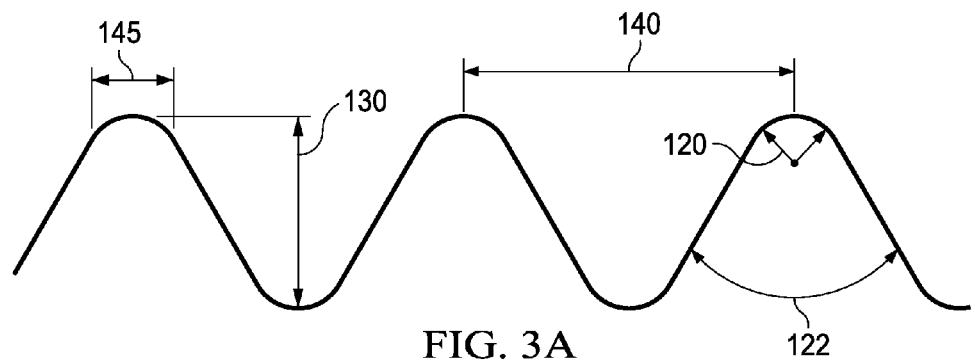
FIG. 3A illustrates a profile view of one surface of a corrugated food product according to one embodiment.
Figure 3B:
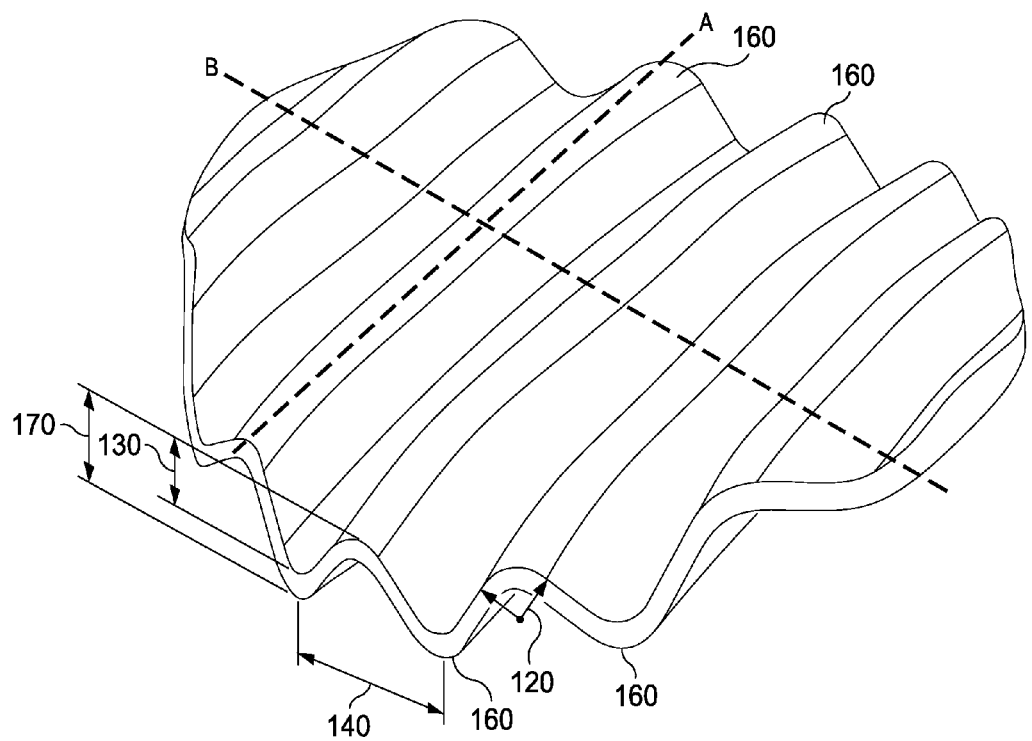
FIG. 3B illustrates a perspective view of a corrugated food product of FIG. 3A according to one embodiment.

FIGS. 3A and 3B better illustrate the dimensions of the corrugation according to one embodiment. FIG. 3A illustrates a profile view of one corrugated surface of the product 100. The tip radius 120 refers to the radius of curvature of a rounded peak of a corrugated food product. In embodiments where a peak is pointed rather than rounded, the tip radius is zero. The included angle 122 is the angle between the sloped lines forming a peak. The amplitude 130 is the vertical distance from apex of the peak to the bottom of the adjacent groove. The pitch 140 is the distance between the apex of two adjacent peaks along the same surface of a corrugated food product. The tip width 145 is the width of the curvature of a peak 102, 106 or a groove 104, 108. FIG. 3B illustrates a perspective view of the corrugated food product 100 according to one embodiment. The amplitude 130, pitch 140, and tip radius 120 are shown in context of the whole corrugated food product 100. The ridges 160, which refers to the horizontal line or narrow surface formed at peaks of the corrugated surface (on either top or bottom surface). In some embodiments, as shown in FIG. 3B, the ridges 160 comprise smooth, arcuate waves. In other embodiments, the peaks comprise sharp angular points (not shown). The overall thickness 170 of the corrugated food product 100 is the distance from the apex of a peak on the first corrugated surface to the apex of a peak on second corrugated surface. In one embodiment of the corrugated food product, the first corrugated surface is substantially identical to a second corrugated surface and both surfaces have the substantially identical tip radius 120, amplitude 130, and pitch 140.

The corrugated food product 100 can be described in terms of these corrugation geometrical terms. In one embodiment, the corrugated food product 100 has variable web thicknesses along a cross-section perpendicular to a series of parallel corrugations along both sides of the product, where the thickness is relatively greater beneath an apex of a peak. The products 100 comprise no perforations or holes. In one embodiment, each of the peaks on either side of the product 100 comprises a symmetrical form, each peak comprising a line of symmetry through the apex of a peak that divides the ridge into halves that are substantially mirror images of each other when viewed with the naked eye. Thus, either side of the peak's line of symmetry comprises substantially the same length when viewed with the naked eye. In other embodiments, the corrugation surfaces have peaks 102, 106 that are nonsymmetrical halves. The amplitude 130 and pitch 140 of the corrugation surfaces on either face of the product 100 are substantially equal and parallel in one embodiment. In other embodiments, peaks 102, 106 have similar but variable amplitude 130 and pitch 140 from one peak to another. In some embodiments, the corrugation has a non-sinusoidal waveform, such as square, rectangular, triangular, spiked, trapezoidal, or saw tooth waves. This can be achieved by varying the tip width 145 and/or the included angle 122 or by any other adjustments known in the art.

In one embodiment, the peaks 102, 106 comprising an amplitude 130 of from about 0.100 inch (2.54 mm) and to about 0.340 inch (8.64 mm), a pitch 140 of from about 0.100 inch (2.54 mm) and not more than 1.50 inch (38.1 mm), a tip radius 120 not more than 0.300 inch (7.62 mm), and a minimum web thickness 112 at least 0.020 inch (0.508 mm) to about 0.080 inch (2.03 mm). In one embodiment, the tip width 145 ranges from about 0 to about 0.500 inch (12.7 mm). The included angle 122 ranges from about 0 degree (e.g., parallel webs 110 in a square or rectangular waveform) to less than 90 degree. In one embodiment, the wet zone concentration 152 diameter ranges from about 0.015 inch (0.38 mm) to about 0.095 inch (2.4 mm).

As described above, in general, the first and second corrugated surfaces each comprise a plurality of pitches 140, each of the pitches ranging from between about 0.100 inch (2.54 mm) to about 1.5 inches (38.1 mm). Pitch values higher than about 1.5 inches (38.1 mm) tend to lose the corrugated appearance, and pitch values below about 0.1 inch (2.54 mm) pitch values make a product that is too dense. In one embodiment, the first corrugated surface and the second corrugated surface each comprise a plurality of pitches, each of the pitches ranging from between about 0.200 inch (5.08 mm) to about 0.600 inch (15.2 mm). In another embodiment, the first corrugated surface and the second corrugated surface each comprise a plurality of pitches, each of the pitches ranging from between about 0.300 inch (7.62 mm) to about 0.500 inch (12.7 mm).

In addition, the first and second corrugated surfaces each comprise a plurality of tip radii 120, each of the tip radii ranging from zero to about 0.300 inch (7.62 mm). In one embodiment, the first corrugated surface and the second corrugated surface each comprise a plurality of tip radii, each of the tip radii ranging from between about 0.040 inch (1.02 mm) to about 0.150 inch (3.81 mm). In another embodiment, the first corrugated surface and the second corrugated surface each comprise a plurality of tip radii, each of the tip radii ranging from between about 0.030 inch (0.76 mm) to about 0.070 inch (1.78 mm).

In addition, the corrugated snack food product may generally comprise a minimum web thickness 112 of between about 0.020 inch (0.51 mm) and about 0.080 inch (2.03 mm). In one embodiment, the corrugated snack food product may comprise a minimum web thickness 112 of between about 0.030 inch (0.76 mm) and about 0.070 inch (1.78 mm). In another embodiment, the corrugated snack food product may comprise a minimum web thickness 112 of between about 0.040 inch (1.02 mm) and about 0.060 inch (1.52 mm). In general, the overall thickness of the snack food products ranges from about 0.230 inch (5.84 mm) to about 0.470 inch (11.94 mm). If much beyond this range, the product can become not large enough to deliver the desired texture or too large for consumers to feel comfortable consuming.

In addition, the corrugated food products comprise first and second corrugated surfaces, each with a plurality of peaks, each peak comprising an amplitude 130 ranging from about 0.100 inch (2.54 mm) to about 0.300 inch (7.62 mm). As will be further described below, lower amplitudes products are not as strong as those having higher amplitudes. In one embodiment, the corrugated surfaces comprise a plurality of peaks, each peak comprising an amplitude ranging from about 0.125 inch (3.17 mm) to about 0.280 inch (7.11 mm). In another embodiment, the corrugated surfaces comprise a plurality of peaks, each peak comprising an amplitude ranging from about 0.100 inch (2.54 mm) to about 0.220 inch (5.59 mm).

FIG. 3B also shows Line A that runs along the ridges 160 (or 0° with respect to the ridge 160) and Line B that runs across or perpendicular to the ridges 160 (or 90° respect to the ridge 160). As will be explained further below, the corrugated food product 100 exhibits different strength characteristics in the 0° versus the 90° orientation. This characteristic is relevant to the objective of providing a unique textural experience for the consumer as the product breaks easier along the ridges 160 while it is more difficult to break across the ridges 160. As used herein, breakage refers to the lack of structural integrity of the finished product. Stated differently, breakage represents the product's inability to remain whole when it impacts a surface or encounters a force, such as a force of biting. This characteristic of the corrugated food product 100 can be quantified in part by area moment of inertia. The area moment of inertia of the product's 100 corrugation pattern can be calculated through an axis of rotation.

Figure 4A:
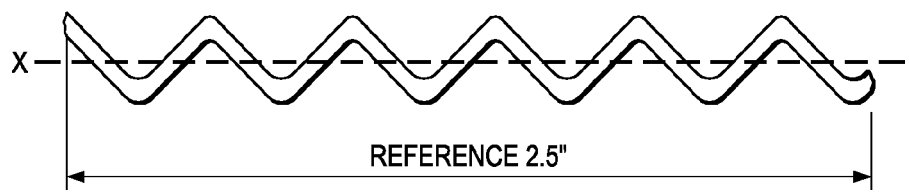
FIGS. 4A and 4B illustrate the central axis upon which the area moment of inertia of the corrugated food product is calculated according to one embodiment.
Figure 4B:
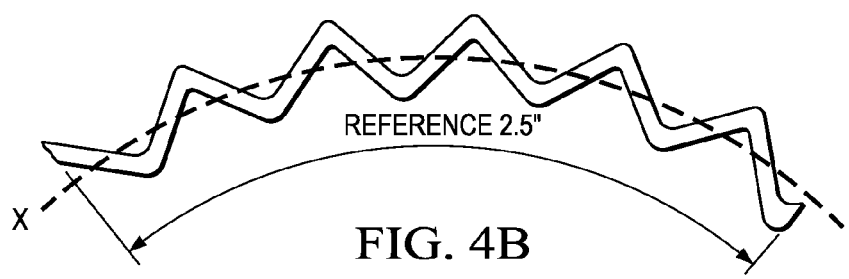

FIGS. 4A and 4B depict the central axis line X used to determine the area moment of inertia. The area moment of inertia (also known as the second moment of inertia) depends on the location of the reference line or axis used. By using a reference line that passes through the area's centroid, or geometric center, the smallest moment of inertia is calculated. As depicted in FIGS. 4A and 4B, the reference line X is the central axis line, bisecting the corrugation pattern midway between the series of ridges 160. The central axis line X may be relatively straight through the centroid of the corrugation, as depicted in FIG. 4A; or it may be curvilinear as depicted, by way of example, at FIG. 4B, so long as the line passes through the centroid. Thus, for purposes of calculation, line X may be curvilinear and the resulting area moment of inertia will represent the inherent corrugated shape without different curvatures that may result from different cooking processes. The area moment of inertia is a property of a cross section that can be used to predict the resistance to bending and deflection. The larger the moment of inertia, the harder it is to bend the product. In products such as potato chips where the finished chip is crisp, it is believed that this property relates to the force to break the product. For a given product, a larger moment of inertia will result in a higher force required to fracture the product.

The following mathematical equations may be used to calculate the area moment of inertia:

$$I_x = \int y^2 dA \quad \text{equ. (1)}$$

where Ix is the area moment of inertia with respect to the reference Line X, reference Line X is the "central axis," dA is the area of an infinitesimally narrow sliver of the corrugated surface, and y is the perpendicular distance from the reference Line X to the centroid, or geometric center, of element dA. A normalized area moment of inertia is the area moment of inertia divided by the minimum web thickness 112. The normalized area moment of inertia enables a more rigorous comparison of corrugation pattern for food products of varying overall thickness because changes in the overall thickness influence both the minimum web thickness 112 and the area moment of inertia for a given sample. By normalizing against the minimum web thickness 112, the effects of changes in corrugation pattern can be evaluated more directly.

Another characteristic of the corrugated food product 100 that affects its strength is the dehydration factor. As used herein, dehydration factor is the ratio of the wet zone concentration diameter to the minimum web thickness 112 of a corrugated food product 100. Dehydration factor relates to the moisture uniformity of the dehydrated product 100. As mentioned above, the areas near the peaks 102, 106 have higher moisture levels. But Applicants have found that when the dehydration factor is below about 1.25, the product is able to dehydrate uniformly under atmospheric pressure frying, for example. Applicants have also found that a dehydration factor between about 1.25 to about 1.7 dehydrates uniformly, for example, under non-atmospheric frying conditions (e.g., vacuum frying). Applicants have also found that combining a geometry that delivers a low dehydration factor and a high area moment of inertia allows for uniform dehydration, a unique textural experience, and good friability. As used herein, friability refers to the tendency of a product to obtain substantially the same moisture throughout its cross-section when subjected to a dehydration process such as frying. Though the present disclosure describes frying as a method of dehydrating the corrugated food product 100, any other dehydration methods known in the art can be used. Such dehydration methods include freeze drying, air drying, or heating (e.g., conduction, convection, or radiation).

Table 1 shows product dimensions, and calculated values for dehydration factor, area moments of inertia, $I_x$, and normalized area moment of inertia, $I_{x-norm}$, for the aforementioned range of amplitude, pitch, and tip radius. Sample numbers 1 through 6 are commercially available (sold on the markets) for prior art samples tested for comparison, and samples 7 through 21 are various embodiments of the corrugated food products 100 disclosed herein. Sample 22 is a flat chip without corrugation that was tested for comparison. Numerical values for the area moment of inertia are calculated on a typical product width and then adjusted to a nominal 2.5-inch width of the corrugated food product 100. The letters A, B, and C following the sample number indicates the three thickness categories (both in terms of the minimum web thickness 112 and the overall thickness 170), where A, B, and C represent nominal, thin, and thick cuts, respectively. "A" indicates nominal minimum web thickness 112 of about 1.397 mm (0.055 inch). "B" indicates thin minimum web thickness 112 in the range from about 0.889 mm (0.035 inch) to about 1.016 mm (0.04 inch). "C" indicates thick minimum web thickness 112 in the range from about 1.778 mm (0.07 inch) to about 1.905 mm (0.075 inch). Thus, for example, commercial product sample 2 was cut using a knife (call it "sample 2 shape" knife) that has a set value of amplitude 130, pitch 140, and tip radius 120. Samples 2A, 2B, and 2C were cut using the "sample 2 shape" knife at different thicknesses. So while the general shape is same among the three samples sharing the same knife, the values for the overall thickness and the minimum web thickness 112, wet zone concentration diameter, and the calculated values of dehydration factor, area moment of inertia, and normalized area moment of inertia are different. Though the previous example is described as cutting the sample with a knife, the corrugated food product can be formed by any other means known in the art, including extrusion, which is capable of reproducing substantially the same shape products.

TABLE 1

Product Dimensions and Calculated Area Moments of Inertia and Dehydration Factors

| Sample | Overall Thickness (mm) | Minimum Web Thickness (mm) | Amplitude (mm) | Pitch (mm) | Tip Radius (mm) | Wet Zone Conc. Diameter (mm) | Dehydration Factor | $I_x$ (×10$^{-11}$ m$^4$) | Norm. $I_{x\text{-}norm}$ (×10$^{-8}$ m$^3$) |
|---|---|---|---|---|---|---|---|---|---|
| 1 A  | 3.200  | 1.397 | 1.270 | 3.175  | 0.3302 | 0.333 | 0.24 | 5.96   | 4.27   |
| 2 A  | 3.658  | 1.397 | 1.727 | 4.318  | 0.4572 | 0.376 | 0.27 | 7.79   | 5.57   |
| 2 B  | 2.972  | 0.889 | 1.727 | 4.318  | 0.4572 | 0.305 | 0.34 | 3.61   | 4.06   |
| 2 C  | 4.369  | 1.905 | 1.727 | 4.318  | 0.4572 | 0.457 | 0.24 | 15.26  | 8.01   |
| 3 A  | 4.039  | 1.397 | 2.108 | 5.385  | 0.5842 | 0.408 | 0.29 | 9.73   | 6.97   |
| 3 B  | 3.505  | 1.016 | 2.108 | 5.385  | 0.5842 | 0.356 | 0.35 | 5.77   | 5.68   |
| 3 C  | 4.547  | 1.778 | 2.108 | 5.385  | 0.5842 | 0.457 | 0.26 | 15.32  | 8.62   |
| 4 A  | 4.039  | 1.397 | 2.108 | 7.620  | 2.286  | 0.525 | 0.38 | 9.85   | 7.05   |
| 5 A  | 4.877  | 1.397 | 2.159 | 4.445  | 1.016  | 1.001 | 0.72 | 23.48  | 16.81  |
| 5 B  | 4.166  | 0.889 | 2.159 | 4.445  | 1.016  | 1.143 | 1.29 | 13.66  | 15.37  |
| 5 C  | 5.537  | 1.905 | 2.159 | 4.445  | 1.016  | 0.838 | 0.44 | 35.85  | 18.82  |
| 6 A  | 3.632  | 1.397 | 1.930 | 12.192 | 4.6228 | 0.272 | 0.19 | 8.20   | 5.87   |
| 6 B  | 3.023  | 0.889 | 1.930 | 12.192 | 4.6228 | 0.203 | 0.23 | 4.03   | 4.54   |
| 6 C  | 4.216  | 1.905 | 1.930 | 12.192 | 4.6228 | 0.381 | 0.20 | 13.32  | 6.99   |
| 7 A  | 6.629  | 1.397 | 4.648 | 11.303 | 1.27   | 0.686 | 0.49 | 34.26  | 24.52  |
| 7 B  | 5.893  | 0.889 | 4.648 | 11.303 | 1.27   | 0.368 | 0.41 | 20.26  | 22.79  |
| 7 C  | 7.341  | 1.905 | 4.648 | 11.303 | 1.27   | 0.762 | 0.40 | 51.50  | 27.03  |
| 8 A  | 7.061  | 1.397 | 4.877 | 10.566 | 1.27   | 0.779 | 0.56 | 44.16  | 31.61  |
| 9 A  | 7.493  | 1.397 | 5.055 | 9.703  | 1.27   | 1.043 | 0.75 | 56.74  | 40.61  |
| 10 A | 7.899  | 1.397 | 5.080 | 8.788  | 1.27   | 1.319 | 0.94 | 73.88  | 52.88  |
| 11 A | 9.042  | 1.397 | 6.604 | 12.700 | 1.651  | 1.038 | 0.74 | 90.98  | 65.13  |
| 12 A | 9.398  | 1.397 | 6.604 | 9.677  | 0.889  | 1.058 | 0.76 | 102.25 | 73.19  |
| 12 B | 8.382  | 0.889 | 6.604 | 9.677  | 0.889  | 0.889 | 1.00 | 60.70  | 68.28  |
| 12 C | 9.906  | 1.905 | 6.604 | 9.677  | 0.889  | 1.143 | 0.60 | 126.62 | 66.47  |
| 13 A | 9.779  | 1.397 | 6.985 | 11.887 | 1.651  | 1.395 | 1.00 | 122.43 | 87.64  |
| 13 B | 8.763  | 0.889 | 6.985 | 11.887 | 1.651  | 0.889 | 1.00 | 73.54  | 82.72  |
| 13 C | 10.795 | 1.905 | 6.985 | 11.887 | 1.651  | 1.727 | 0.91 | 180.48 | 94.74  |
| 14 A | 9.347  | 1.397 | 5.385 | 8.179  | 1.524  | 2.162 | 1.55 | 146.11 | 104.59 |
| 15 A | 10.719 | 1.397 | 7.264 | 11.328 | 1.8796 | 2.055 | 1.47 | 188.97 | 135.27 |
| 15 B | 9.449  | 0.889 | 7.264 | 11.328 | 1.8796 | 1.295 | 1.46 | 112.28 | 126.30 |
| 15 C | 11.963 | 1.905 | 7.264 | 11.328 | 1.8796 | 2.413 | 1.27 | 283.68 | 148.91 |
| 16 A | 9.474  | 1.397 | 5.385 | 5.334  | 0.508  | 1.184 | 0.85 | 130.22 | 93.21  |
| 17 A | 6.604  | 1.397 | 3.810 | 8.204  | 1.651  | 1.399 | 1.00 | 48.49  | 34.71  |
| 17 B | 5.588  | 0.889 | 3.810 | 8.204  | 1.651  | 0.889 | 1.00 | 26.49  | 29.80  |
| 17 C | 7.518  | 1.905 | 3.810 | 8.204  | 1.651  | 1.702 | 0.89 | 76.22  | 40.01  |
| 18 A | 12.725 | 1.397 | 8.636 | 10.566 | 1.524  | 2.178 | 1.56 | 311.21 | 222.77 |
| 19 A | 7.569  | 1.397 | 5.385 | 9.982  | 0.508  | 0.526 | 0.38 | 45.04  | 32.24  |
| 20 A | 5.639  | 1.397 | 3.810 | 13.513 | 3.048  | 0.428 | 0.31 | 25.41  | 18.19  |
| 21 A | 12.725 | 1.397 | 8.636 | 7.722  | 0.508  | 1.183 | 0.85 | 257.99 | 184.67 |
| 21 B | 11.227 | 0.889 | 8.636 | 7.722  | 0.508  | 0.940 | 1.06 | 148.20 | 166.70 |
| 21 C | 14.199 | 1.905 | 8.636 | 7.722  | 0.508  | 1.448 | 0.76 | 389.10 | 204.25 |
| 22 A | 1.35   | 1.35  | N/A   | N/A    | N/A    | 0     | 0    | 1.296  | 0.96   |

As shown by Table 1, the lower amplitudes previously known in the art, which range from about 1.270 mm (sample 1) to about 2.159 mm (sample 5), result in lower area moments of inertia. As a result, the low amplitude products are not as strong as the corrugated food products having higher amplitudes at least with respect to the orientation parallel to the central axis X (e.g., along line B in FIG. 3B or in the 90° orientation). Conversely, though, too high of an amplitude may provide for undesirable texture that is too hard (e.g., sample 21). Thus, in embodiments where texture is a concern, the amplitude should be less than about 0.340 inch (8.636 mm). In another embodiment, the amplitude is less than or equal to about 0.286 inch (or 7.62 mm). In addition, if the dehydration factor is above about 1.7, the products have a poor dehydration uniformity, which gives the product less friability, making it more difficult to obtain a shelf stable, crunchy, crispy product with desirable coloring and texture.

Figure 5A:
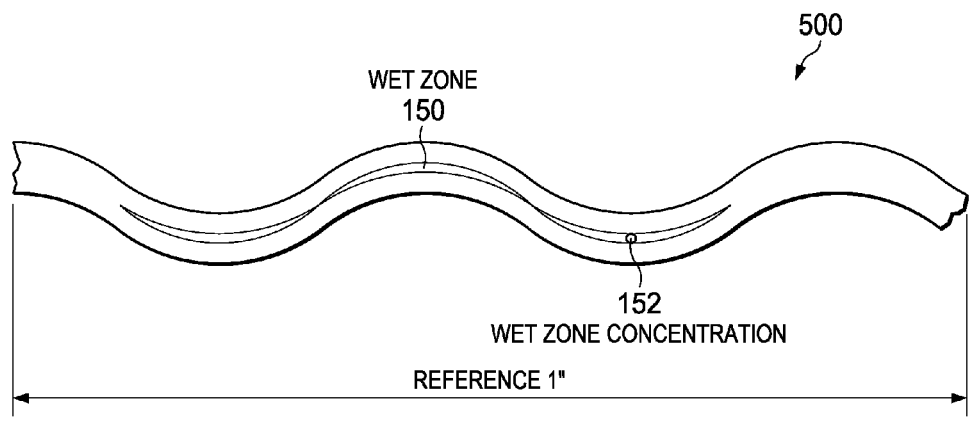
FIG. 5A illustrates a cross-sectional view taken along a plane perpendicular to the corrugations of a prior art corrugated food product.
Figure 5B:
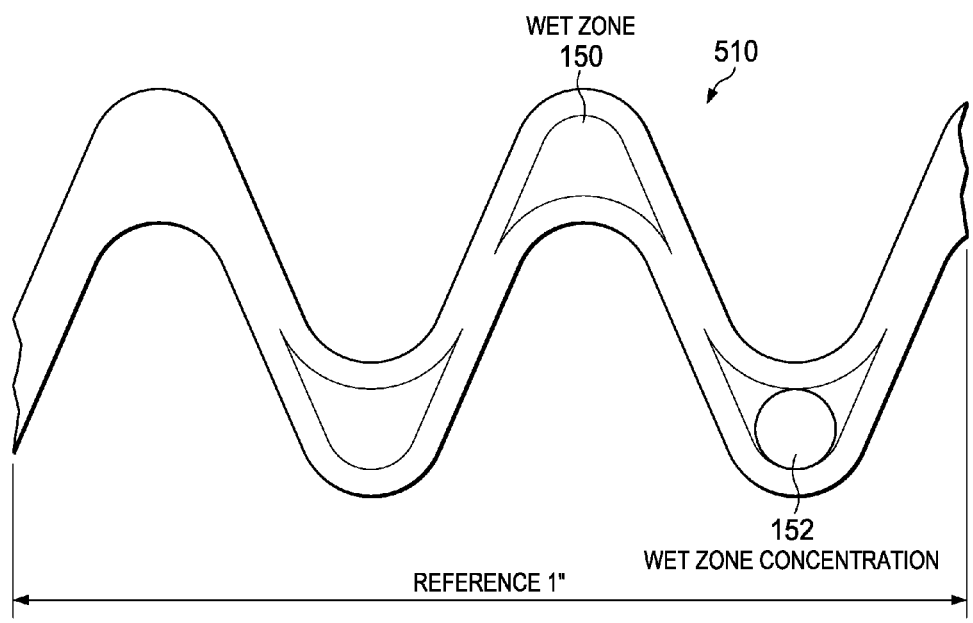
FIG. 5B illustrates a cross-sectional view taken along a plane perpendicular to the corrugations of a sample corrugated food product.
Figure 5C:
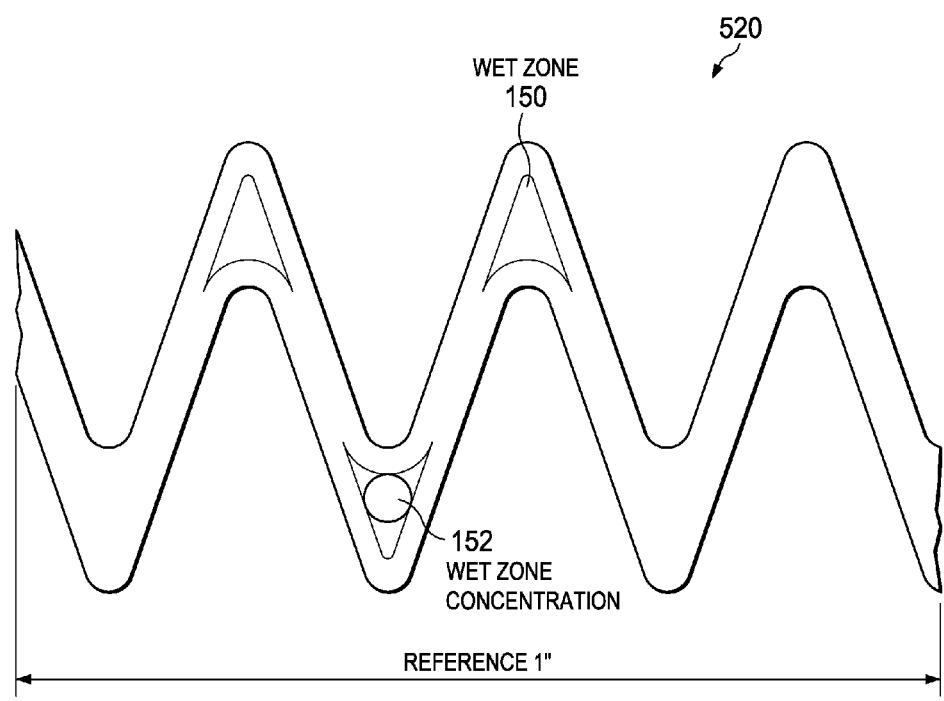
FIG. 5C illustrates a cross-sectional view taken along a plane perpendicular to the corrugations of a sample corrugated food product.

To further aid the visualization of the samples tested in Table 1, some examples are illustrated in FIGS. 2, 5A, 5B, and 5C to show embodiments of the present disclosure and prior art samples. FIG. 2 illustrates the corrugated product 100 representing sample 10. FIG. 5A illustrates the prior art product 500 representing sample 6. FIG. 5B illustrates the corrugated food product 510 representing sample 15. FIG. 5C illustrates the corrugated food product 520 representing sample 21.

The area moments of inertia of all 21 samples (cut at thickness A) were plotted against the dehydration factor as depicted in FIG. 6A. Prior art sample numbers 1-6 are marked with an X within the circle. The plotted data points for the corrugated food product 100 of FIG. 2 (sample 10), prior art product 500 (sample 6), corrugated food products 510 (sample 15) and 520 (sample 21) are marked accordingly in FIG. 6A to further distinguish for illustrative purposes. The prior art product 500 (sample 6) has a wet zone 150 and a wet zone concentration 152 as shown in FIG. 5A. While the prior art product 500 has an acceptable dehydration factor of about 0.19 (calculated at thickness A), it also comprises a lower area moment of inertia at about 8.20× 10$^{-11}$ m$^4$. The corrugated food product 510 (sample 15) similarly has a wet zone 150 and a wet zone concentration 152 as shown in FIG. 5B. While the product 510 has an acceptable area moment of inertia at about 188.68×10$^{-11}$ m$^4$, the dehydration factor is about 1.47, which is well above the dehydration factor determined as desirable. It is difficult to form a shelf stable product where the dehydration factor is too high. The corrugated food product 520 (sample 21) also has a wet zone 150 and a wet zone concentration 152 as shown in FIG. 5C. While the product 520 comprises an acceptable dehydration factor of about 0.85 (calculated at thickness A), the area moment of inertia is much higher than desired, at about $257.99 \times 10^{-11}$ m$^4$, which in turn provides for a less desirable product and texture. Comparatively, one embodiment of the corrugated product 100 as illustrated in FIG. 2 (sample 10) has both the area moment of inertia ($73.88 \times 10^{-11}$ m$^4$) and the dehydration factor (0.94) in the acceptable range. Thus, both the dehydration factor and the area moment of inertia as recited herein contribute to an enhanced textural experience, which has been found to be heartier, crunchier and overall more desirable than other corrugated food products presently known.

In general, various embodiments of the corrugated food product 100 comprises an area moment of inertia values of between about $25 \times 10^{-11}$ to about $200 \times 10^{-11}$ m$^4$ and a dehydration factor of less than about 1.25. As depicted in FIG. 6A, above about 1.25, the products suffer from poor dehydration uniformity where the cooking process must continue for longer periods of time until a low moisture content is achieved throughout the product for long term storage or shelf stability. Variable cooking rates typically produce over-dried areas and high scorch flavor notes as well as less visually appealing products following dehydration. In one embodiment, a corrugated food product 100 comprises an area moment of inertia of between about $28 \times 10^{-11}$ m$^4$ to about $100 \times 10^{-11}$ m$^4$. In another embodiment, a corrugated food product 100 comprises an area moment of inertia of between about $30 \times 10^{-11}$ m$^4$ to about $50 \times 10^{-11}$ m$^4$. In one embodiment, the corrugated food products 100 comprise a dehydration factor of less than about 0.90. In another embodiment, the corrugated food products 100 comprise a dehydration factor of less than about 0.60.

FIG. 6B illustrates a scatter plot of the normalized area moments of inertia against the dehydration factor for all 21 samples at various thicknesses (A, B, and C). This was done to show the effect of varying thicknesses of the corrugated food product on the normalized area moment of inertia, which translates to the relationship between the thickness of the product versus its strength (or breakability). Surprisingly, increasing or decreasing the thickness of the prior art products (samples 1-6) did not result in a significant increase in the normalized area moment of inertia. For example, increasing the minimum web thicknesses 112 of prior art product 500 (sample 6) from 1.397 mm (sample 6A) to 1.905 mm (samples 6C) increased the normalized area moment of inertia from $5.87 \times 10^{-8}$ m$^3$ to $4.54 \times 10^{-8}$ m$^3$. Even at the higher normalized area moment of inertia, the prior art sample 6 was unable to attain the desired level of normalized area moment of inertia, resulting in products that are insufficiently hearty or crispy. The corrugated product 520 (sample 21), on the other hand, has too high of level of normalized area moment of inertia, resulting in excessive textural experience. In one embodiment, the corrugated food product 100 comprises a normalized area moment of inertia of between about $20 \times 10^{-8}$ m$^3$ and about $160 \times 10^{-8}$ m$^3$. In another embodiment, the corrugated food product 100 comprises a normalized area moment of inertia of between about $20 \times 10^{-8}$ m$^3$ and about $80 \times 10^{-8}$ m$^3$. As with noted in FIG. 6A and accompanying text, the dehydration factor is less than about 1.7 in one embodiment. In another embodiment, the corrugated food products 100 comprise a dehydration factor of less than about 0.90. In other embodiments, the corrugated food products 100 comprise a dehydration factor of less than about 0.60. The corrugated products 510 (sample 15) has dehydration factor ranging from 1.27 to 1.46 depending on the thickness. This is too high of dehydration factor as explained above. Thus, generally, the preferred embodiments of the corrugated food products 100 have a normalized area moment of inertia and dehydration factor levels within the region boxed and labeled as "desirable moment of inertia" in FIG. 6B.

In one aspect, the present invention relates to a method of making corrugated snack food product for consumption. A method for producing a corrugated snack food product comprises the steps of: providing a food product; shaping the food product to have a first corrugated surface on a first side of the product and a second corrugated surface on a second side of the product, wherein the first and second corrugated surfaces are substantially parallel and comprise a plurality of peaks; and cooking the product thereby producing a corrugated snack food product with peaks having an amplitude from about 0.100 inch (2.54 mm), a normalized area moment of inertia of between about $20 \times 10^{-8}$ m$^3$ and about $160 \times 10^{-8}$ m$^3$, and a dehydration factor of less than 1.7.

The providing step comprising one or more of the steps of forming, impressing, molding, shaping, cutting, extruding or obtaining from a third party corrugated food products according to the principles and characteristics disclosed herein. In one embodiment, forming of the corrugated food products having a high-amplitude, high normalized area moment of inertia and low dehydration factor comprises the steps of sheeting a dough material into a cohesive dough; impressing a corrugated configuration on both surfaces of the dough sheet; and cutting the corrugated dough sheet into suitably shaped pieces. The cutting may be done before or after the corrugated configurations are impressed upon a dough, which can be formed by the step of mixing together any number of dry ingredients with a liquid solution. By way of example, suitable dry ingredients may be derived from any number of fruits or vegetable and may include without limitation, dehydrated potato products, corn products, grains, wheat, barley or flours. The forming of the corrugated configuration may be performed, for example, by compressing the dough in between a pair of corrugated sheet rolls or by extruding the dough through corrugated die openings. In one embodiment, forming may comprise the step of molding. In another embodiment, the forming of may be accomplished by slicing a food product into the desired shape. Forming may also be accomplished by expanding one or more pellets. Suitable food products include without limitation turnips, carrots, roots, tubers, fruits, vegetables, or potatoes such as, for example, sweet potatoes, Russet potatoes or any variety of chipping potato. Chipping variety potatoes are those potatoes normally used for frying and include, for example, Saturna, Lady Rosetta, Lady Clair, Hermes, Maris Piper, Erntestolz, Agria, Atlantic, Monona, Norchip, Snowden, Kennebec, Oneida, and Tobique. Of course, such food products are provided for purposes of illustration and not limitation. As described above, the corrugations of one side of the product should be substantially in phase with the corrugations on the opposing side of the product, should comprise substantially the same pitch and amplitude and consist of a plurality of symmetrical peaks, each having substantially the same amplitude. In other embodiments, the first and the second corrugated surfaces are phase shifted up to about 25% of the pitch 140.

Following the providing step, the product may then be cooked to reduce the moisture content. Cooking steps may preserve the product for subsequent cooking or may reduce the moisture to a final content of between about 0.8% and about 3% by weight of finished product. In one embodiment, the product may be partially cooked then preserved for subsequent cooking. In general, the moisture content should be reduced to at least about 50%. In embodiments where the cooking preserves the product for freezing, the cooking step reduces the moisture content to between about 0.8% and about 50%. In some embodiments, the moisture content may be reduced to between about 12% and 50% before freezing. Subsequently, the method may further comprise a freezing step, where the product is frozen to temperatures below about 32° F. until subsequent cooking for consumption is desired. Products requiring refrigeration are also possible. In such embodiments, the cooking step reduces the moisture content to between about 0.8% to about 12%. The cooking step may reduce the moisture content to between about 3.5% to about 12% in some embodiments. Thereafter, the method may comprise a refrigeration step, wherein the product may be refrigerated to temperatures of about 32° F. to about 40° F. until subsequent cooking for consumption is desired.

Conventional cooking means, such as baking or frying, can be employed to produce a shelf stable snack in accordance with the present invention. Other dehydration processes include without limitation air drying, electromechanical drying, radio frequency (RF), microwave, macrowave, vacuum or pressure assisted drying or any combination thereof. Generally, the product can be cooked at temperatures ranging from about 150° F. up to about 550° F., depending upon the cooking process used. In one embodiment, the product should be cooked at temperatures below about 550° F. In another embodiment, the product should be cooked at temperatures below about 450° F. In another embodiment, the product should be cooked at temperatures below about 350° F. In yet another embodiment, the product should be cooked at temperatures below about 250° F. In one embodiment, the corrugated product is fried using a liquid cooking medium such as oil in temperatures of less than about 400° F. In one embodiment, the product is fried in a liquid cooking medium such as oil at temperatures below about 365° F. to about 300° F. In another embodiment, the product is fried in a liquid cooking medium such as oil at temperatures below about 320° F. to about 250° F. In one embodiment, cook time is less than 12 minutes. In another embodiment, cook time is less than 4 minutes. Cook time for kettle style chips is between about 8 to 11 minutes at temperatures of less than about 320° F. to about 250° F. Cook time for continuous frying processes is between about 2.4 to about 4 minutes at higher temperatures of between about 300° F. to about 370° F. When cooked in an oven, cook time may range from about 4 to about 15 minutes at between about 300° F. to about 500° F., depending on the amount of heat transfer. In another embodiment, the corrugated product is baked by any means known in the art.

Examples of products that can be made using the method described herein include without limitation formed potato chips, corn chips, wheat chips, multi-grain chips, crackers, and the like. Finished, shelf-stable products comprise a unique structural strength and a high resistance to breaking Other metrics useful for characterizing the finished product comprise shelf life, moisture, hardness, breaking force, color (L-values or RGB analysis), various acoustic measurements and flavor and measurement of volatile and non-volatile compounds. For example, the fracturability of the corrugated food products may be measured using a ball probe compression/fracture device where a sample is placed on a cylinder and a ball probe is lowered onto the sample until it bends and then fractures. Analysis of the mechanical properties can be performed with the measurements of force, time, distance and work. Mechanical properties may be analyzed as follows: 1) an initial slope of a plot of the force vs. time to provide a measure of the resistance to bending; 2) a plot of force vs. distance of the first fracture; 3) maximum force and distance as a measure of sample hardness; 4) the work required to completely break through the sample; 5) the total number of peaks (differing by 5 grams force) which is related to the number of fracture events; and 6) the total linear distance as a measure of "jaggedness," which often relates to crispness of a product.

The sounds or acoustics of the corrugated food product can also be analyzed. By recording the sounds as the products fracture using the ball probe compression/fracture device, any number of properties can be determined. For example, the following may be analyzed: 1) the frequency spectrum of the sounds, which may relate to the tonal character and whether the sample is crispy, crunchy or crackly; 2) the number of sound peaks, which relates to the number of fracture events; and 3) the total sound energy, which relates to how noisy the product is. Raw data of a number of samples may be evaluated using mathematical techniques such as analysis of variance (ANOVA) or least significant difference (LSD) in order to identify further characteristics of the product for each of the individual mechanical properties mentioned above. In addition, the multivariate nature of the texture of these food products (flat, ridged, and high-amplitude-ridged) can be investigated by fusing all mechanical properties mentioned above via multivariate data analysis techniques such as PCA (Principal Component Analysis), PLS (Partial Least Squares), PLS-DA (PLS-Discriminant Analysis), and PCA-DA (PCA-Discriminant Analysis) to identify unique textural characteristics of the high-amplitude corrugated products described herein.

Figure 7A:
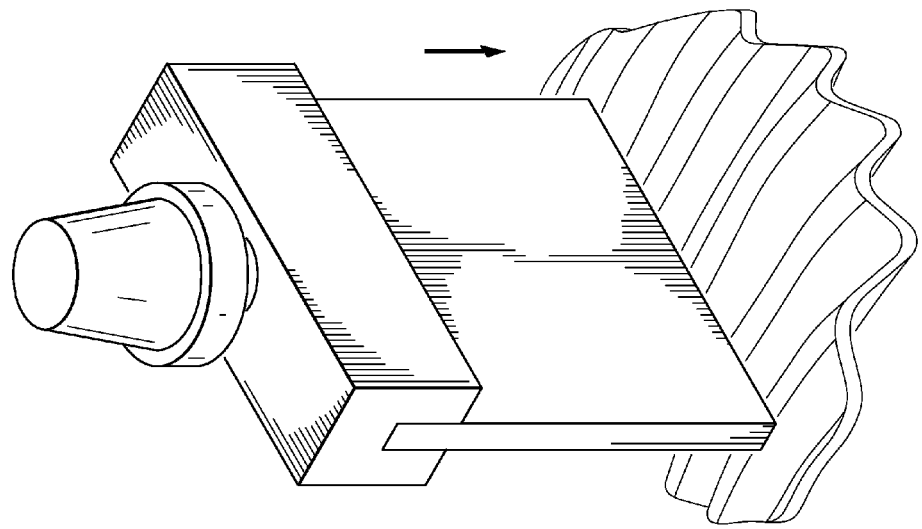
FIG. 7A illustrates a perspective view of the hardness testing method in the 0° orientation according to one embodiment.
Figure 7B:
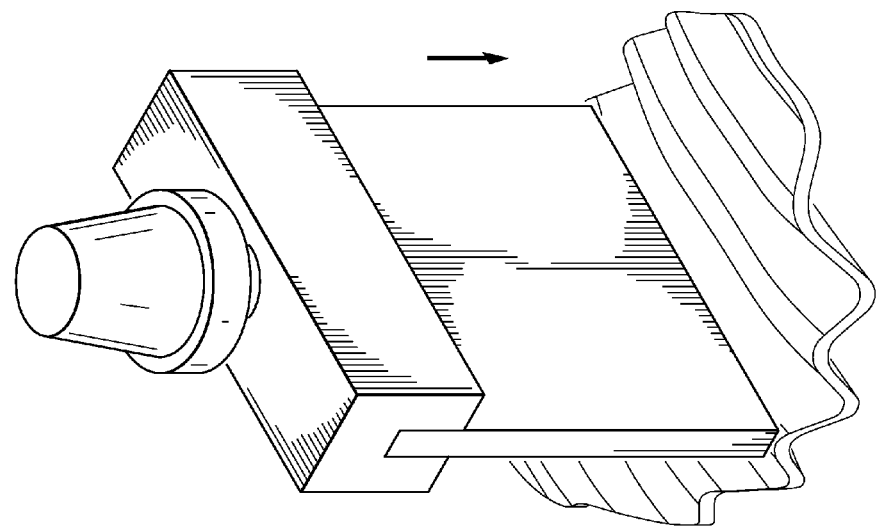
FIG. 7B illustrates perspective view of the hardness testing method in the 90° orientation according to one embodiment.
Figure 7C:
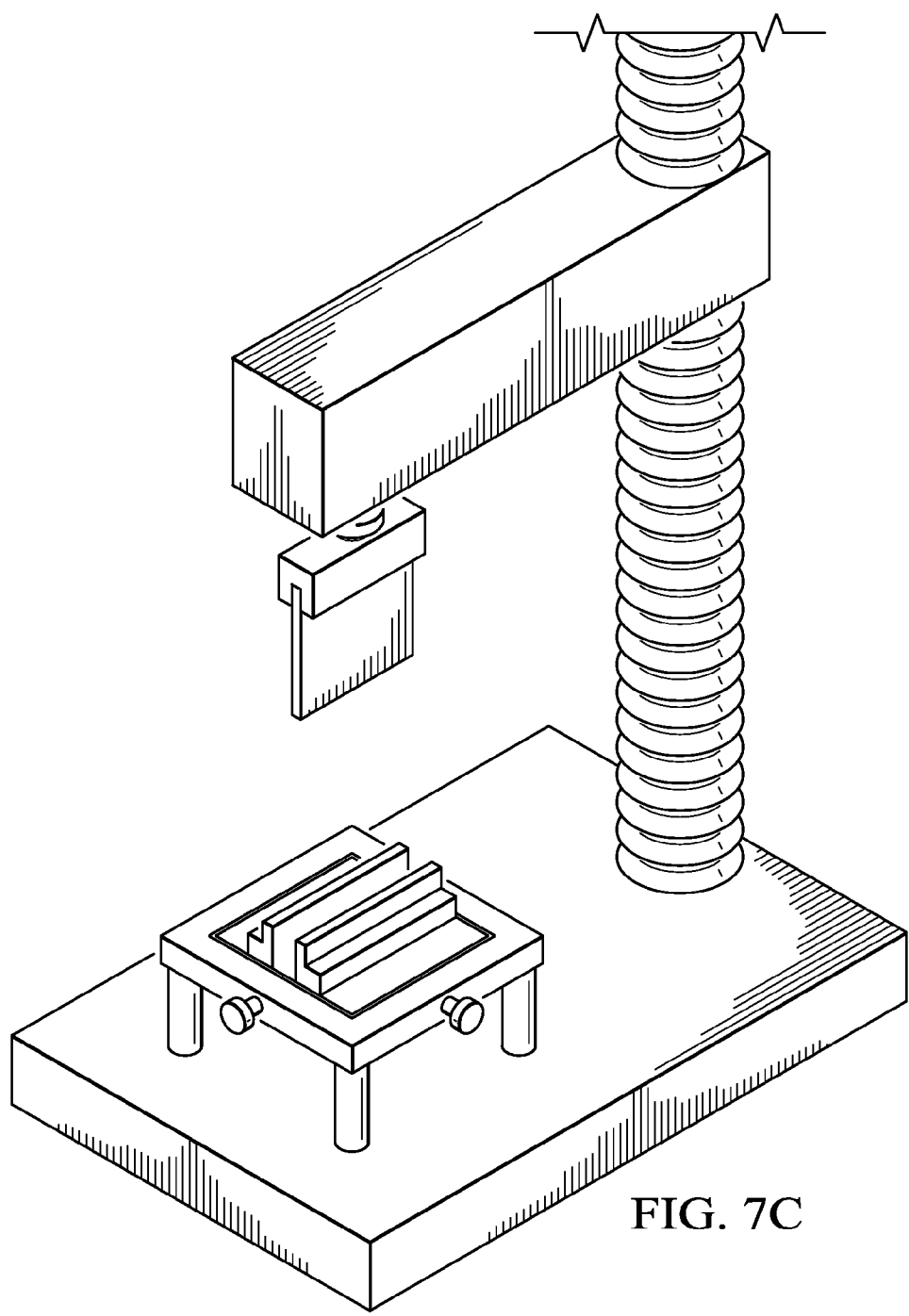
FIG. 7C illustrates perspective view of the hardness testing apparatus according to one embodiment.

Because the high-amplitude corrugated food product 100 exhibit a unique mechanical characteristics (e.g., high normalized area moment of inertia and high resistance to breakage) as well as textural experience, Applicants have developed a method of objectively testing and quantifying the texture characteristics. FIGS. 7A, 7B, and 7C illustrate one embodiment of the three-point compression or bend testing apparatus. Due to the unique shape of the corrugated food product 100, the compression test is carried out in two different orientations. First, as shown in FIG. 7A, the three-point bend test is carried out in the 0° with respect to the ridge 160, parallel to Line A in FIG. 3B. Second, as shown in FIG. 7B, another three-point bend test is carried out in the 90° with respect to the ridge 160, parallel to Line B in FIG. 3B. As noted above and will be explained further below, the corrugated food product 100 exhibits different strength characteristics in the 0° versus the 90° orientation. The three points of compression, as shown in FIG. 3C, are the blade moving in the downward direction upon the corrugated food product 100 and the edges of the two bend supports. The corrugated food product 100 rests on the two bend supports and the downward blade descends upon the corrugated food product 100 at a known speed and with known force. In one embodiment, TA.XT2 Texture Analyzer made from Texture Technologies Corp. is used. In another embodiment, any system capable of carrying out the disclosed testing method is used. In one embodiment, the downward blade is 3 mm thick with rounded end and the distance between the two bend supports is 14.5 mm. In one embodiment, the blade acts upon the same length of the corrugated product in both 0 and 90 degree orientations. In an alternate embodiment, the blade acts upon a different length in the 0 versus the 90 degree orientation when considered in proportion to the product length or width. For example, a product having an oblong shape tested with 2 inch length and 1 inch width impacted with a blade of 2 inch width would have a different proportion of the product tested in the 0 versus the 90 degree orientations. In such embodiments, the results can be scaled accordingly (e.g., on force per length basis). A 50 kg loading cell is used in one embodiment as the compression loads. In one embodiment, the downward blade descends at 20.00 mm per second, which simulates the speed of human jaws biting a food product. In one embodiment, a penetration distance is 8.00 mm and a trigger force of 5.0 g is used. As used herein, a trigger force describes the threshold value required to indicate when t=0 starts.

A three-point bend test enables an objective quantification of the unique texture of the corrugated food product 100. The textural characteristics tested are hardness and crispiness. FIG. 8 illustrates a graphical representation 800 of the hardness and crispiness testing results according to one embodiment. As used herein, hardness refers to the maximum compressive force (e.g., 802, 804) required to fracture a corrugated food product 100. This is analogous of the first bite into the corrugated food product. Because the three-point bend testing apparatus above described uses a constant speed and acceleration, the force values can be expressed simply in terms of mass (e.g., grams). As used herein, crispiness is represented by the gradient or the slope (e.g., 812, 814) of the line drawn between the initial force at t=0 to the peak force at t=x, wherein x is the time at which the maximum compressive force (e.g., 802, 804) is measured. This gradient represents the stiffness or deformability modulus. When graphed on a stress verses strain axes, the gradient represents the Young's modulus. The graph 800 shows the hardness 802 and the crispiness 812 for the 0° test. It also shows a much higher 804 hardness and a higher crispiness 814 values in the 90° test.

Applicants conducted the three-point hardness testing on three embodiments of the corrugated food product 100 as here disclosed and eight commercially available potato chip products for comparison. The three embodiments of the corrugated food product 100, A, B, and C are substantially similar to Samples 11A, 12A, and 7A from Table 1, respectively. While the tested samples were two plain potato chips, six corrugated (or wavy) potato chips, and three embodiments of the corrugated food product 100 in the form of potato chips, it is within the scope of the present disclosure to encompass any corrugated food product and is not limited merely to potato chips. Table 2 summarizes the hardness results and Table 3 summarizes the crispiness results for the chips tested. Each type of chip was tested with 30 chips at 0° and 90°.

TABLE 2

Hardness Testing Results

| Sample | 90° | | 0° | |
|---|---|---|---|---|
| | Result | σ (std. dev.) | Result | σ (std. dev.) |
| Embodiment A (Sample 11A) | 4850 | 1338 | 578 | 146 |
| Embodiment B (Sample 12A) | 7375 | 1877 | 1459 | 455 |
| Embodiment C (Sample 7A) | 1803 | 476 | 521 | 165 |

TABLE 2-continued

Hardness Testing Results

| Sample | 90° | | 0° | |
|---|---|---|---|---|
| | Result | σ (std. dev.) | Result | σ (std. dev.) |
| Corrugated 1 | 897 | 242 | 464 | 130 |
| Corrugated 2 | 934 | 275 | 617 | 143 |
| Corrugated 3 | 645 | 300 | 457 | 148 |
| Corrugated 4 | 1017 | 294 | 828 | 246 |
| Corrugated 5 | 889 | 246 | 702 | 192 |
| Corrugated 6 | 1151 | 298 | 1083 | 254 |
| Plain 1 | 1668 | 473 | 1545 | 398 |
| Plain 2 | 350 | 104 | 395 | 108 |

TABLE 3

Crispiness Testing Results

| Sample | 90° | | 0° | |
|---|---|---|---|---|
| | Result | σ (std. dev.) | Result | σ (std. dev.) |
| Embodiment A (Sample 11A) | 28879 | 9680 | 3046 | 1891 |
| Embodiment B (Sample 12A) | 29440 | 13562 | 7048 | 3733 |
| Embodiment C (Sample 7A) | 13728 | 4624 | 3764 | 1496 |
| Corrugated 1 | 5892 | 2758 | 4153 | 1670 |
| Corrugated 2 | 7173 | 3164 | 5294 | 2134 |
| Corrugated 3 | 4196 | 2589 | 3531 | 1953 |
| Corrugated 4 | 11122 | 4323 | 7348 | 2529 |
| Corrugated 5 | 4852 | 3063 | 4913 | 2176 |
| Corrugated 6 | 10276 | 3732 | 8799 | 3514 |
| Plain 1 | 3087 | 1547 | 2580 | 875 |
| Plain 2 | 2345 | 1226 | 2238 | 1278 |

Figure 9A:
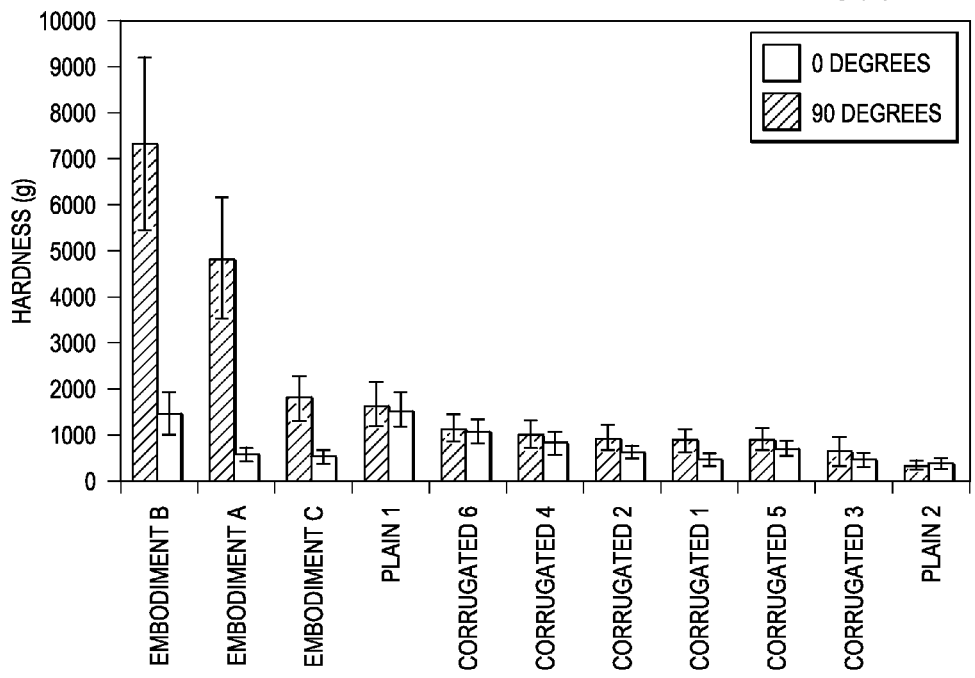
FIG. 9A illustrates a graphical representation of the relationship between the 90° orientation and the 0° orientation hardness results of three embodiments of the corrugated food product compared to commercially available corrugated food products.

FIG. 9A illustrates the hardness testing results for the tested samples. All of the commercial products showed negligible difference between the 90° test and the 0° test results. All embodiments of the corrugated product 100 that were tested, however, showed a significantly higher hardness in the 90° test than the 0° test. To better illustrate and understand the unique hardness characteristics of the corrugated product 100, the 90°-to-0° ratio values were calculated using Equation 2:

$$\text{Hardness Ratio} = \frac{\text{Hardness in } 90° \text{ Test}}{\text{Hardness in } 0° \text{ Test}} \qquad \text{equ. (2)}$$

Figure 9B:
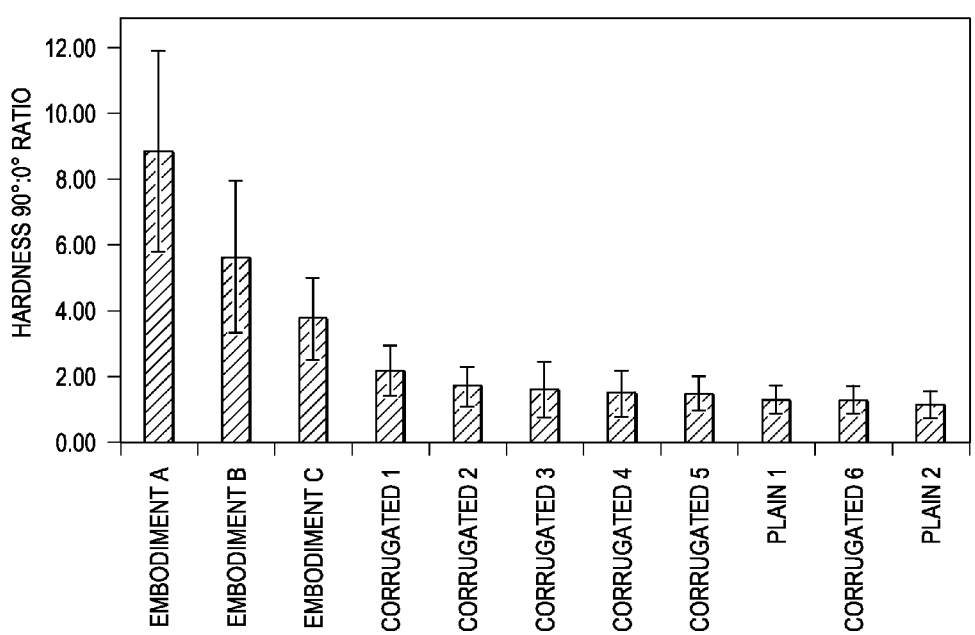
FIG. 9B illustrates a graphical representation of the 90°-to-0° hardness ratios of three embodiments of the corrugated food product compared to commercially available corrugated food products.

The 90°-to-0° hardness ratio values for the tested samples are plotted in FIG. 9B. Embodiments of the corrugated food product 100 exhibits a statistically significantly higher 90°-to-0° hardness ratio when compared to commercially available potato chips.

Figure 10A:
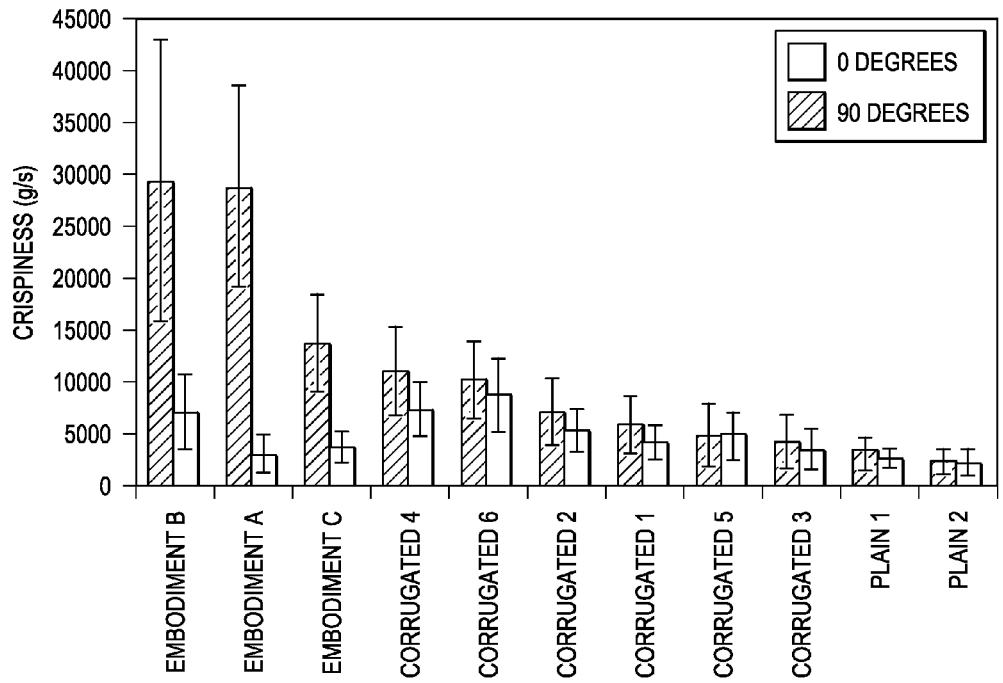
FIG. 10A illustrates a graphical representation of the relationship between the 90° orientation and the 0° orientation crispiness of three embodiments of the corrugated food product compared to commercially available corrugated food products.

Similarly, the crispiness values were calculated and plotted in FIG. 10A. The difference between embodiments of the corrugated food product 100 and commercially available potato chips are more explicitly seen when the 90°-to-0° crispiness ratio values are compared. The 90°-to-0° crispiness ratio value is calculated using Equation 3:

$$\text{Crispiness Ratio} = \frac{\text{Crispiness in } 90° \text{ Test}}{\text{Crispiness in } 0° \text{ Test}} \qquad \text{equ. (3)}$$

Figure 10B:
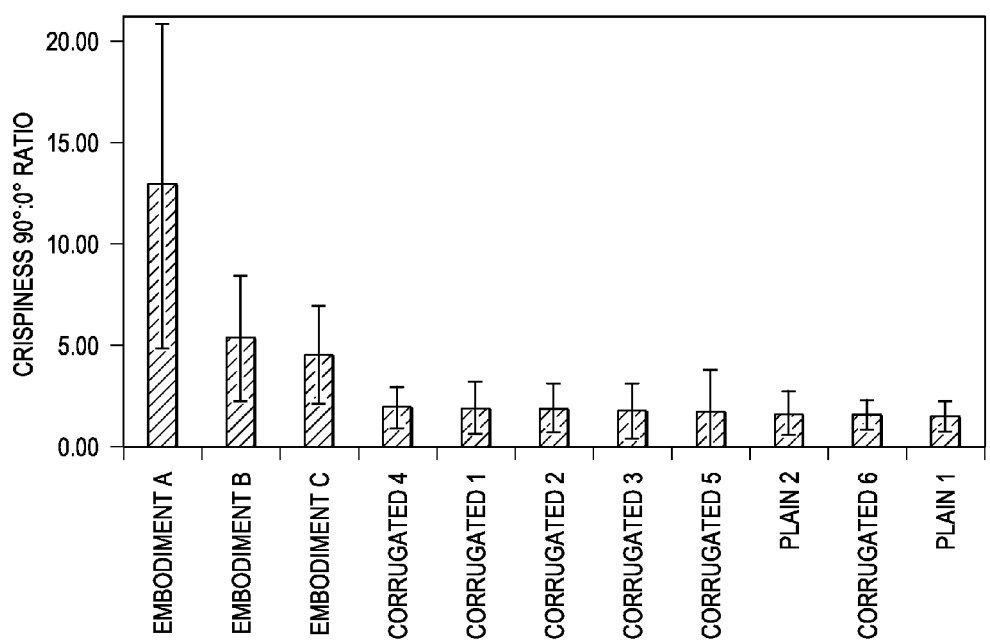
FIG. 10B illustrates a graphical representation of the 90°-to-0° crispiness ratios of three embodiments of the corrugated food product compared to commercially available corrugated food products.

The 90°-to-0° crispiness ratio values for the tested samples are plotted in FIG. 10B. The commercially available corrugated potato chips had 90°-to-0° crispiness ratio values that are quite similar to plain potato chips. Embodiments of the corrugated food product 100, however, had a 90°-to-0° crispiness ratios that are nearly 2 to 10 times that of the commercially available products tested.

Figure 11A:
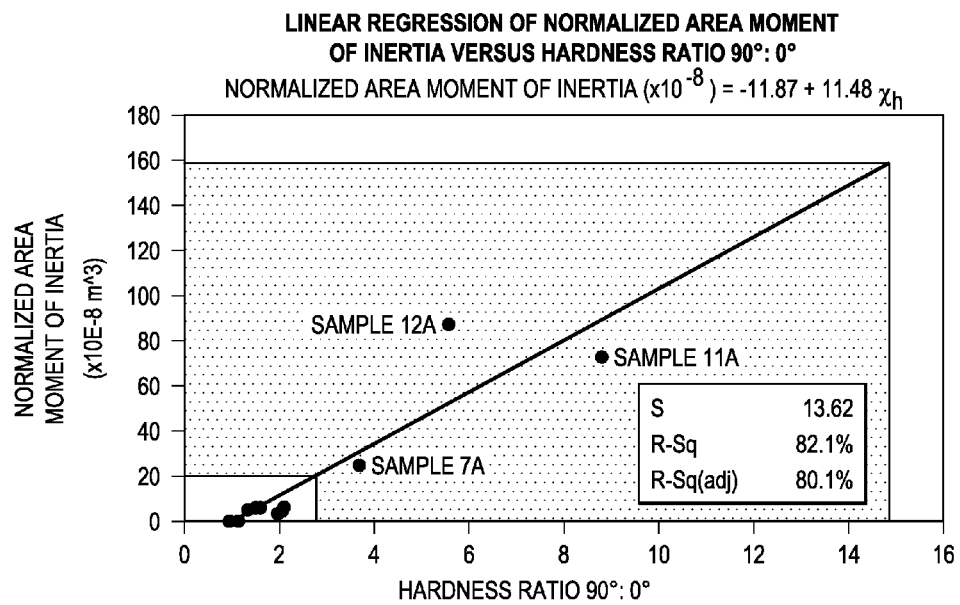
FIG. 11A illustrates a graphical representation of the linear regression of normalized area moment of inertia versus 90°-to-0° hardness ratio.
Figure 11B:
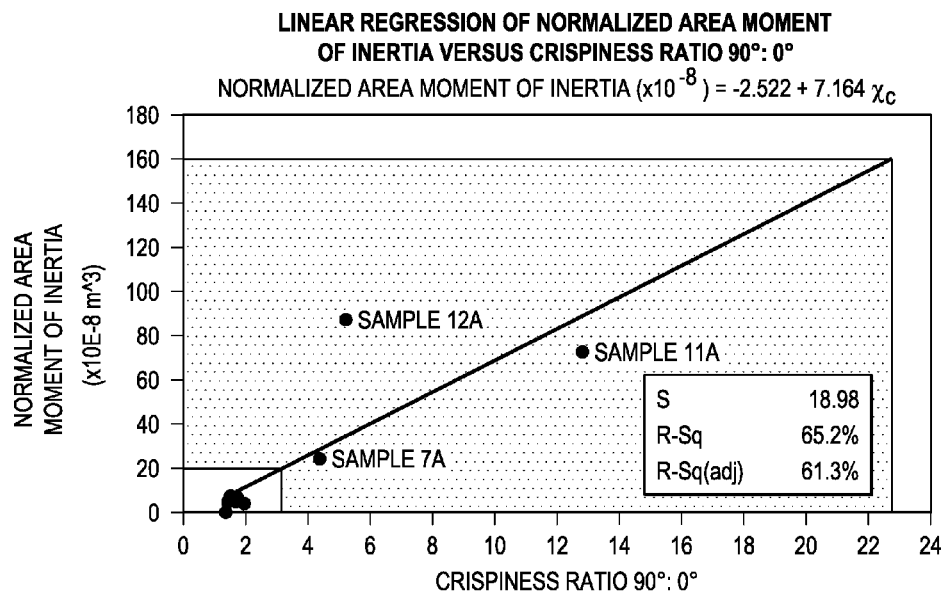
FIG. 11B illustrates a graphical representation of the linear regression of normalized area moment of inertia versus 90°-to-0° crispiness ratio.

The corrugated food product 100 exhibits a distinct characteristic texture in both hardness and crispiness measurements, especially when the 90°-to-0° ratios are compared. Various statistical models were utilized as methods to identify the embodiments of the corrugated food product 100 disclosed here versus commercially available corrugated food product. For example, Applicants used the analysis of variable (ANOVA), linear discriminant analysis (LDA), and ordinary linear regression to analyze corrugated food product 100 and the commercial products as listed in Tables 2 and 3. The ANOVA results showed that the mean 90°-to-0° hardness ratio (ranging from about 1.252 to about 3.086) and 90°-to-0° crispiness ratio (ranging from about 2.362 to about 8.133) values for the corrugated food product 100 were different in statistically significant way when compared to the commercial products' 90°-to-0° hardness ratio (ranging from about 0.418 to about 0.824) and 90°-to-0° crispiness ratio (ranging from about 2.362 to about 8.133) values. The linear discriminant analysis was carried out using the following predictors: hardness at 0°; hardness at 90°; 90°-to-0° hardness ratio; crispiness at 0°; crispiness at 90°; and 90°-to-0° crispiness ratio. Using the six predictors, LDA was able to identify the three embodiments (Embodiments A, B, and C) of the corrugated food product 100 approximately 73% to 97% of the time compared to any of the tested commercially available corrugated food products. Furthermore, a linear regression analysis enables one to predict whether a given corrugated food product is a high-amplitude (and consequently high normalized area moment of inertia) corrugated food product 100 of the present disclosure. For example, FIGS. 11A and 11B show linear regression results on hardness and crispiness 90°-to-0° ratios, respectively, versus the normalized area moment of inertia. FIG. 11A represents a fitted line plot using linear regression on the 90°-to-0° hardness ratio of the tested samples (the results of which are summarized above in Table 2). The fitted line has an equation of:

$$y(\times 10^{-8}) = -11.87 + 11.45 x_h \qquad \text{equ. (4)}$$

where y is the normalized area moment of inertia and $x_h$ is the 90°-to-0° hardness ratio. The adjusted coefficient of determination ($R^2$ value) of this line is 0.801. In the one embodiment where the normalized area moment of inertia is between about $20\times10^{-8}$ m$^3$ and about $160\times10^{-8}$ m$^3$, the corresponding range of 90°-to-0° hardness ratio is between about 2.78 to about 14.97. This represents the shaded region in FIG. 11A. In another embodiment where the range of normalized area moment of inertia is between about $20\times10^{-8}$ m$^3$ and about $80\times10^{-8}$ m$^3$, the corresponding range of 90°-to-0° hardness ratio is between about 2.78 to about 8.02.

Similarly, FIG. 11B represents a fitted line plot using linear regression on the 90°-to-0° crispiness ratio of the tested samples. The fitted line has an equation of:

$$y(\times 10^{-8}) = -2.522 + 7.164 x_c \qquad \text{equ. (5)}$$

where y is the normalized area moment of inertia and $x_c$ is the 90°-to-0° gradient ratio. The adjusted $R^2$ value of this line is 0.613. In the one embodiment where the normalized area moment of inertia is between about $20\times10^{-8}$ m$^3$ and about $160\times10^{-8}$ m$^3$, the corresponding range of 90°-to-0° crispiness ratio is between about 3.14 to about 22.69. This represents the shaded region in FIG. 11B. In another embodiment where the range of normalized area moment of inertia is between about $20\times10^{-8}$ m$^3$ and about $80\times10^{-8}$ m$^3$, the corresponding range of 90°-to-0° crispiness ratio is between about 3.14 to about 11.52. It should be understood that these statistical analyses are provided as a description of how the distinctive textural characteristics of the high amplitude corrugated food product 100 is statistically distinguishable by objective textural testing. The statistical confidence or coefficient of determination values provided above are not intended to be limitive nor intended to characterize the high amplitude corrugated food product 100.

The above description of the present invention has been presented for purposes of illustration and description, and is not intended to be exhaustive or limited to the invention in the form disclosed. The embodiments chosen were described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. A corrugated food product comprising:
    a first side and a second side, wherein the first side comprises a first corrugated pattern and the second side comprises a second corrugated pattern, wherein the first and the second corrugated patterns are substantially parallel and wherein the first and the second corrugated patterns comprise a plurality of peaks, wherein the second corrugated pattern is substantially in phase with the first corrugated pattern and wherein the food product comprises a normalized area moment of inertia of between $20\times10^{-8}$ m$^3$ and about $160\times10^{-8}$ m$^3$, and a dehydration factor of less than about 1.7, an overall thickness ranging from mm 5.84 to about 11.94 mm, and a plurality of peaks with substantially equal amplitude ranging from about 3.17 to about 7.11 mm.

2. The corrugated food product of claim 1 wherein at least one of the peaks comprise a wet zone concentration diameter ranging from about 0.38 mm to about 2.4 mm.

3. The corrugated food product of claim 1 wherein at least one of the peaks comprise a pitch ranging from about 2.54 mm to about 38.1 mm.

4. The corrugated food product of claim 1 wherein at least one of the peaks comprise a tip radius ranging from about 0 mm to about 7.62 mm.

5. The corrugated food product of claim 1 further comprising a minimum web thickness ranging from about 0.5 mm to about 2.03 mm and a dehydration factor of less than 1.25.

6. The corrugated food product of claim 1 further comprising a 90°-to-0° hardness ratio of at least about 2.78.

7. The corrugated food product of claim 1 further comprising a 90°-to-0° crispiness ratio of at least about 3.14.

8. The corrugated food product of claim 1 wherein the corrugated food product is formed from at least one ingredient selected from a group consisting of: potatoes, tubers, fruits, corn, legumes, and grains.

9. A corrugated food product comprising:
    a first side and a second side, wherein the first side comprises a first corrugated pattern and the second side comprises a second corrugated pattern, wherein the first and the second corrugated patterns are substantially parallel and wherein the first and the second corrugated patterns comprise a plurality of peaks with substantially equal amplitude of at least 3.17 mm, wherein the second corrugated pattern is substantially in phase with the first corrugated pattern, and wherein the food product comprises a 90°-to-0° hardness ratio of at least about 2.78, an overall thickness ranging from 5.84 mm to about 11.94 mm, and a dehydration factor of less than about 1.7.

10. The corrugated food product of claim 9 wherein the 90°-to-0° hardness ratio is less than about 14.97.

11. The corrugated food product of claim 9 further comprising a normalized area moment of inertia of between $20 \times 10^{-8}$ m$^3$ and about $160 \times 10^{-8}$ m$^3$, and a wet zone concentration diameter ranging from about 0.38 mm to about 2.4 mm.

12. The corrugated food product of claim 9 further comprising a dehydration factor of less than about 1.25.

13. The corrugated food product of claim 9 wherein the peaks comprise an amplitude ranging from about 3.17 to about 7.11 mm.

14. The corrugated food product of claim 9 further comprising a minimum web thickness ranging from about 0.5 mm to about 2.03 mm.

15. The corrugated food product of claim 9 wherein the corrugated food product is formed from at least one ingredient selected from a group consisting of: potatoes, tubers, fruits, corn, legumes, and grains.

16. A corrugated food product comprising:
a first side and a second side, wherein the first side comprises a first corrugated pattern and the second side comprises a second corrugated pattern, wherein the first and the second corrugated patterns are substantially parallel and wherein the first and the second corrugated patterns comprise a plurality of peaks with substantially equal amplitude of at least 3.17 mm, wherein the second corrugated pattern is substantially in phase with the first corrugated pattern, and wherein the food product comprises a 90°-to-0° crispiness ratio of at least about 3.14, an overall thickness ranging from 5.84 mm to about 11.94 mm, and a dehydration factor of less than 1.7.

17. The corrugated food product of claim 16 wherein the 90°-to-0° crispiness ratio is less than about 22.69.

18. The corrugated food product of claim 16 further comprising a normalized area moment of inertia of between $20 \times 10^{-8}$ m$^3$ and about $160 \times 10^{-8}$ m$^3$.

19. The corrugated food product of claim 16 further comprising a dehydration factor of less than about 1.25.

20. The corrugated food product of claim 16 wherein at least one of the peaks comprise an amplitude ranging from about 2.54 mm to about 8.64 mm.

21. The corrugated food product of claim 16 further comprising a minimum web thickness ranging from about 0.5 mm to about 2.03 mm.

22. The corrugated food product of claim 16 wherein the corrugated food product is formed from at least one ingredient selected from a group consisting of: potatoes, tubers, fruits, corn, and legumes, grains.

23. The corrugated food product of claim 1 comprising a minimum normalized area moment of inertia of $22.79 \times 10^{-8}$ m$^3$.

24. The corrugated food product of claim 1 comprising an amplitude of at least 4.648 mm.

25. The corrugated food product of claim 9 comprising an amplitude of at least 4.648 mm.

26. The corrugated food product of claim 16 comprising an amplitude of at least 4.648 mm.

* * * * *